(12) United States Patent
Szymczak et al.

(10) Patent No.: US 11,028,105 B2
(45) Date of Patent: Jun. 8, 2021

(54) DIFLUOROMETHYL AND DIFLUOROMETHYLENE TRANSFER REAGENTS

(71) Applicant: REGENTS OF THE UNIVERSITY OF MICHIGAN, Ann Arbor, MI (US)

(72) Inventors: Nathaniel Szymczak, Ypsilanti, MI (US); Jacob Geri, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 58 days.

(21) Appl. No.: 16/455,887

(22) Filed: Jun. 28, 2019

(65) Prior Publication Data
US 2020/0002362 A1    Jan. 2, 2020

Related U.S. Application Data

(60) Provisional application No. 62/691,735, filed on Jun. 29, 2018.

(51) Int. Cl.
*C07F 5/05* (2006.01)
*C07F 5/02* (2006.01)
*C07F 5/04* (2006.01)

(52) U.S. Cl.
CPC .............. *C07F 5/05* (2013.01); *C07F 5/027* (2013.01); *C07F 5/04* (2013.01)

(58) Field of Classification Search
CPC .............. C07F 5/05; C07F 5/027; C07F 5/04
See application file for complete search history.

(56) References Cited

U.S. PATENT DOCUMENTS

| 5,756,849 A | 5/1998 | Forat et al. |
| 7,119,232 B2 | 10/2006 | Prakash et al. |
| 2014/0066640 A1* | 3/2014 | Prakash ............... C07D 307/44 549/497 |

FOREIGN PATENT DOCUMENTS

EP     0733614 B2    1/2010

OTHER PUBLICATIONS

"Cytochrome P450", Wikipedia, last edited Jul. 23, 2019.
Aikawa et al., Siladifluoromethylation and Difluoromethylation onto C(sp(3)), C(sp(2)), and C(sp) Centers Using Ruppert-Prakash Reagent and Fluoroform, Org. Lett., 18(14):3354-7 (Jul. 2016).
Algera et al., Sodium Diisopropylamide: Aggregation, Solvation, and Stability, J. Am. Chem. Soc., 139(23):7921-30 (Jun. 2017).
Ashirbaev et al., Copper-Catalyzed Coupling of Acyl Chlorides with gem-Difluorinated Organozinc Reagents via Acyl Dithiocarbamates, J. Org. Chem., 83(1):478-83 (Jan. 2018).
Ashirbaev et al., Coupling of gem-difluorinated organozinc reagents with S-electrophiles, J. Fluorine Chem., 191:143-8 (Nov. 2016).
Ashwood et al., Development of a Scaleable Synthesis of a 3-Aminopyrazinone Acetamide Thrombin Inhibitor, Org. Process Res. Dev., 8(2):192-200 (2004).
Bloodworth et al., A mild, convenient, halogen-exchange route to gem-difluorides and trifluorides, Tetrahedron Lett., 28(44):5347-50 (1987).
Chen et al., Bis(difluoromethyl)trimethylsilicate Anion: A Key Intermediate in Nucleophilic Difluoromethylation of Enolizable Ketones with Me3 SiCF2 H, Angew. Chem. Int. Ed. Engl., 55(41):12632-6 (Oct. 2016).
Chen et al., Selective Single C(sp3)-F Bond Cleavage in Trifluoromethylarenes: Merging Visible-Light Catalysis with Lewis Acid Activation, J. Am. Chem. Soc., 139(51):18444-7 (Dec. 2017).
Clavel et al., Selective Electrosynthesis of (Trimethylsilyldifluoro)methylbenzene, a PhCF2—Precursor; Conditions for a Molar Scale Preparation without HMPA, Synthesis, 1999(5):829-34 (1999).
Fawcett et al., The Chemistry of Carbonyl Fluoride. I. The Fluorination of Organic Compounds, J. Am. Chem. Soc., 84(22):4275-85 (1962).
Fier et al., Copper-mediated difluoromethylation of aryl and vinyl iodides, J. Am. Chem. Soc., 134(12):5524-7 (Mar. 2012).
Geri et al., Borazine-CF3-Adducts for Rapid, Room Temperature, and Broad Scope Trifluoromethylation, Angew. Chem. Int. Ed. Engl., 57(5):1381-5 (Jan. 2018).
Geri et al., Recyclable Trifluoromethylation Reagents from Fluoroform, J. Am. Chem. Soc., 139(29):9811-4 (Jul. 2017).
Guidotti et al., Preparation of (Phenyldifluoromethyl)- and (Phenoxydifluoromethyl)-silanes by Magnesium-Promoted Carbon-Chlorine Bond Activation, Synlett., 2004(10):1759-62 (2004).
Hagooly et al., Pyridine•BrF3, the missing link for clean fluorinations of aromatic derivatives, Org. Lett., 14(4):1114-7 (Feb. 2012).
Jiang et al., Efficient nucleophilic difluoromethylation of aldehydes with (phenylsulfonyl)difluoromethylzinc and (phenylsulfonyl)difluoromethylcadmium reagents, J. Fluorine Chem., 198:67-75 (2016).
Kondratyev et al., Reaction of gem-difluorinated organozinc reagents with β-nitrostyrenes, J. Fluorine Chem., 176:89-92 (Aug. 2015).
Krishnmoorthy et al., Nucleophilic difluoromethylation of aromatic aldehydes using trimethyl(trifluoromethyl)silane (TMSCF3), J. Fluorine Chem., 208:10-14 (2018).
Lee et al., 2-(2-Chloro-6-fluorophenyl)acetamides as potent thrombin inhibitors, Bioorg. Med. Chem. Lett., 17(22):6266-9 (Nov. 2007).
Levin et al., Reactions of difluorocarbene with organozinc reagents, Org. Lett., 15(4):917-9 (Feb. 2013).
Levin et al., Reactions of organozinc reagents with potassium bromodifluoroacetate, J. Fluorine Chem., 171:97-101 (Mar. 2015).
Lochmann et al., Interactions of alkoxides : XI. Reactions of substituted N-lithium amides with heavier alkali metal alkoxides. a novel method for the preparation of N-sodium and N-potassium dialkylamides, J. Organometallic Chem., 179(2):123-32 (Oct. 1979).

(Continued)

*Primary Examiner* — John Mabry
(74) *Attorney, Agent, or Firm* — Marshall, Gerstein & Borun LLP

(57) ABSTRACT

Disclosed herein are borazine, borate, and azaborinine compounds and compositions, methods of making said compounds and compositions, and methods of forming aromatic difluorocarbon compounds and difluorocarbon compounds.

20 Claims, 4 Drawing Sheets

(56) References Cited

OTHER PUBLICATIONS

Markovskij et al., Application of Dialkylaminosulfur Trifluorides in the Synthesis of Fluoroorganic Compounds, Synthesis, 1973(12):787-9 (1973).

Maryanoff et al., Exploration of potential prodrugs of RWJ-445167, an oxyguanidine-based dual inhibitor of thrombin and factor Xa, Chem. Biol. Drug Des., 68(1):29-36 (Jul. 2006).

Merchant et al., Modular radical cross-coupling with sulfones enables access to sp3-rich (fluoro)alkylated scaffolds, Science, 360(6384):75-80 (Apr. 2018).

Mizuta et al., Catalytic Decarboxylative Fluorination for the Synthesis of Tri- and Difluoromethyl Arenes, Org. Lett., 15:2648-51 (May 2013).

Rassolov et al., 6-31G* basis set for third-row atoms, J. Comput. Chem., 22(9):976-84 (Jul. 2001).

Rohr et al., Syntheses of [6,6]-Fused-Ring 1,2-Azaborines, Organometallics, 33(5):1318-21 (2014).

Scalmani et al., Continuous surface charge polarizable continuum models of solvation. I. General formalism, 132:114110 (2010).

Smirnov et al., Reactions of 1,1-difluoroalkylzinc halides with chlorinating reagents, Russ. Chem. Bull., 63(11):2564-6 (Nov. 2014).

Sondej et al., Gem-Difluoro compounds: a convenient preparation from ketones and aldehydes by halogen fluoride treatment of 1,3-dithiolanes, J. Org. Chem., 51(18):3508-13 (1986).

Xia et al., Visible light-promoted metal-free C—H activation: diarylketone-catalyzed selective benzylic mono- and difluorination, J. Am. Chem. Soc., 135(46):17494-500 (Nov. 2013).

Yerien et al., Frontispiece: Difluoromethylation Reactions of Organic Compounds, Chemistry: A European Journal, 23(59):14676 (Oct. 2017).

Zemtsov et al., Reactions of gem-difluoro-substituted organozinc reagents with propargyl halides, Russ. Chem. Bull., 65(11):2760-2 (Nov. 2016).

Zeng et al., Development of a Practical Sequence for Difluoromethylation of 2-Bromopyridines via Copper-Mediated Reductive Coupling and Decarboxylation, Asian J. Org. Chem., 4(11):1262-4 (Nov. 2015).

Zhang et al., Homolytic bond dissociation energies of the benzylic carbon-hydrogen bonds in radical anions and radical cations derived from fluorenes, triphenylmethanes, and related compounds, J. Am. Chem. Soc., 114(25):9787-92 (1992).

Zhao et al., The M06 suite of density functionals for main group thermochemistry, thermochemical kinetics, noncovalent interactions, excited states, and transition elements: two new functionals and systematic testing of four M06-class functionals and 12 other functionals, 120(1-3):215-41 (May 2008).

* cited by examiner

DIFLUOROMETHYL AND DIFLUOROMETHYLENE TRANSFER REAGENTS

STATEMENT OF US GOVERNMENT SUPPORT

This invention was made with government support under grant number CHE-1350877, awarded by the National Science Foundation. The government has certain rights in the invention.

BACKGROUND

Benzylic methylene linkages (denoted $ArCH_2$—R) are common features of many compounds of therapeutic interest. P450 enzymes are proteins primarily found in the liver that are responsible for detoxifying and metabolizing small molecules found in the blood stream. This is accomplished primarily by oxidizing functional groups on these molecules through radical-driven reaction mechanisms. The oxidized compounds are generally more soluble or readily degrade, making excretion of the compounds easier. In particular, benzylic methylene functionalities are prone to the activity of P450 enzymes, and thus therapeutic molecules containing this moiety have low metabolic stability (Zhang et. al, *Journal of the American Chemical Society*, 1992, 114, 9787). Aryl difluoromethylene ($ArCF_2$—R) linkages are similar in size, but are not degraded by the activity of P450 enzymes and thus this functionality results in compounds that are significantly more stable within the human body (Maryanoff et al, *Chemical Biology & Drug Design*, 2006, 68, 29). An additional benefit is that this functionality results in molecules that are more lipophilic and thus are generally more bioavailable.

Despite the advantageous nature of aryl difluoromethylene linkages, said linkages are generally difficult to synthesize, though there are several potential synthetic methodologies by which they can be accessed: (a) through the use of strong fluorinating reagents like trifluorosulfuranes to directly replace hydroxyl or aldehyde functional groups (Markovskij et. al, *Synthesis*, 1973, 1973, 787), (b) Through the use of electrophilic bromine sources to modify thiols, followed by addition of a nucleophilic fluoride source that replaces the brominated thiol functionality (Sondej et. al, *Journal of Organic Chemistry*, 1986, 51, 3508), (c) through radical fluorination reaction mechanisms using reagents like Selectfluor (Xia et. al, *Journal of the American Chemical Society*, 2013, 135, 17494), or (d) through nucleophilic fluorination of chlorinated starting materials using nucleophilic fluoride sources (Bloodworth et. al, *Tetrahedron Letters*, 1987, 28, 5347). These methods generally present significant problems such as safety concerns stemming from the generation of explosive byproducts, to poor specificity for fluorination stemming from the highly reactive nature of the reagents required. There is a need for safer and more selective syntheses of aryl difluoromethylene linkages.

The difluoromethyl group is indispensable in medicinal chemistry as a metabolically stable, lipophilic hydrogen bond donor, and 100,000 reported molecules now contain this functionality. It can be installed through deoxyfluorination of aldehydes, and recently several efficient reagents for electrophilic ($CF_3SO_3CF_2H$, $BrCF_2H$) and radical (Zn$(SO_2CF_2H)_2$) difluoromethylation have been developed. However, nucleophilic difluoromethylation methodologies are more uncommon. To avoid the challenges of direct $CF_2H^-$ transfer, stabilized $CF_2Q^-$ synthons (Q=benzoyl-, phosphonate/phosphonium-, $PhSO_2$) can be prepared, installed, and hydrolyzed to expose the desired R—$CF_2H$ product. Direct $CF_2H^-$ transfer is more desirable, but only a small range of reagents are available ($Me_3SiCF_2H$, $Bu_3SnCF_2H$, $Zn(CF_2H)_2(TMEDA)$, $iPrAgCF_2H$). Notably, boron-based $CF_2H^-$ transfer reagents remain unreported, and existing reagents are prepared from expensive or ozone-depleting $Me_3SiCF_3$, $ClCF_2H$, or $BrCF_2H$.

In contrast, difluoromethane ($CF_2H_2$) could be an attractive source of the difluoromethyl group if it could be deprotonated to reveal nucleophilic $CF_2H^-$ fragments. It is nontoxic, has zero ozone-depleting potential, is not a potent greenhouse gas, and is currently manufactured on a large scale (>15,000 metric tons per year) as a refrigerant. However, it has never been used as a source of $CF_2H^-$ due to its high $pK_a$ (35-41) and the instability of "naked" $CF_2H^-$ species which would be generated upon deprotonation. When $CF_2H^-$ is generated in the presence of a fluorophilic cation such as $Li^+$, immediate defluorination is observed, while $[Cs(18-crown-6)_2]\pm[CF_2H]^-$ proposed to be released from $Me_3Si(CF_2H)_2$ readily deprotonates THF. These problems could be resolved by deprotonating $CF_2H_2$ in the presence of a Lewis acid (LA) that can capture $CF_2H^-$ as a LA-$CF_2H^-$ adduct, and then later release $CF_2H^-$ in reactions with electrophilic substrates. Selection of an appropriate Bronsted base and Lewis acid is critical, because the Lewis acid and Bronsted base must be strong enough to deprotonate $CF_2H_2$ and stabilize $CF_2H^-$ while avoiding the formation of inert acid-base adducts with each other.

There is a need for a cheap, nontoxic, and environmentally friendly—$CF_2H$ and —$CF_2Ar$ transfer reagents.

SUMMARY

Provided herein are compounds of Formula (I):

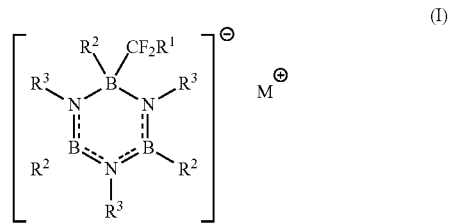

wherein: the dashed lines indicate optional double bonds; $R^1$ is $C_{6-20}$ aryl or $C_{1-15}$ heteroaryl, and the heteroaryl comprises 1-5 ring heteroatoms selected from N, O, and S; each $R^2$ and $R^3$ is independently OH, $N(R^4)_2$, $C_{1-6}$alkyl, $C_{3-8}$cycloalkyl, $OC_{1-6}$alkyl, or $OC_{3-8}$cycloalkyl; or adjacent $R^2$ and $R^3$, taken together with the atoms to which they are attached, form an optionally substituted 5-7 membered ring; each $R^4$ is independently $C_{1-6}$alkyl or $C_{3-8}$cycloalkyl; and M comprises a counterion.

Also provided herein are compounds having a structure of:

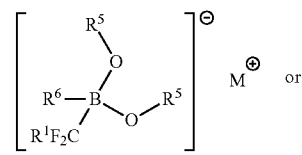

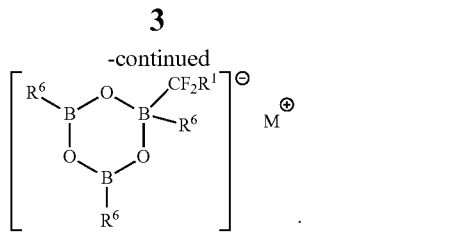

wherein: $R^1$ is $C_{6-20}$aryl or $C_{1-15}$heteroaryl, and the heteroaryl comprises 1-5 ring heteroatoms selected from N, O, and S; each $R^5$ is independently $C_{1-6}$alkyl, $C_{3-8}$cycloalkyl; or each $R^5$ taken together with the atoms to which they are attached form an optionally substituted 5-7 membered ring; each $R^6$ is independently $C_{1-6}$alkyl, $C_{3-8}$cycloalkyl, $OC_{1-6}$alkyl, or $OC_{3-8}$cycloalkyl; and M comprises a counterion.

In some embodiments, $R^1$ is $C_{6-20}$aryl. In embodiments, $R^1$ is $C_{1-15}$heteroaryl. In some cases, $R^1$ is selected from the group consisting of:

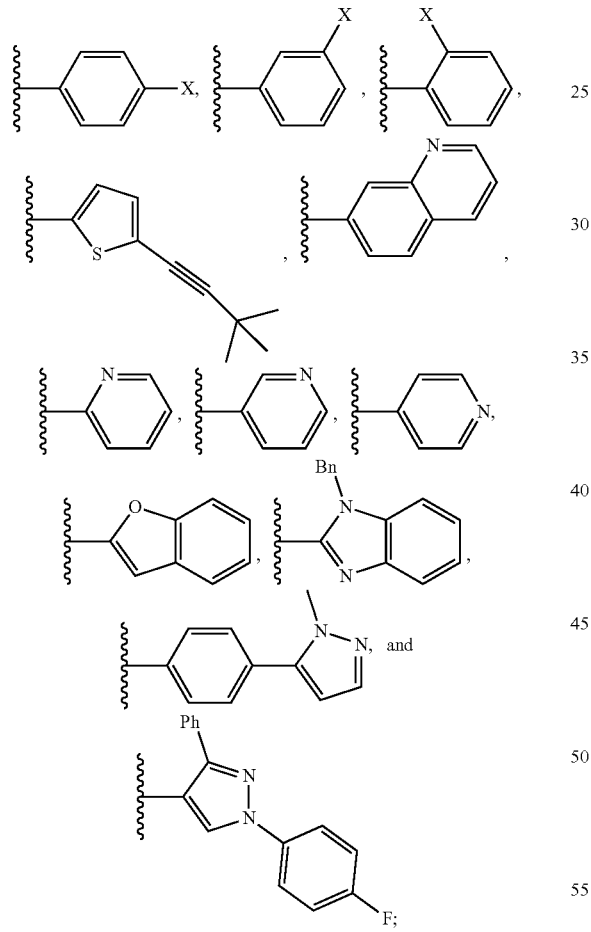

and
X is H, F, Cl, Br, I, $CH_3$, OH, $NH_2$, $NO_2$, $C_{1-4}$alkyl, $OC_{1-4}$alkyl, $CO_2H$, CHO, $CF_3$, or ON.

In embodiments, at least one $R^2$ or $R^3$ is $C_{1-6}$alkyl. In some cases, at least one $R^2$ or $R^3$ is methyl.

In embodiments, M comprises Li, Na, K, Rb, Cs, or $NH_4$.

In embodiments, the compound has a structure selected from the group consisting of:

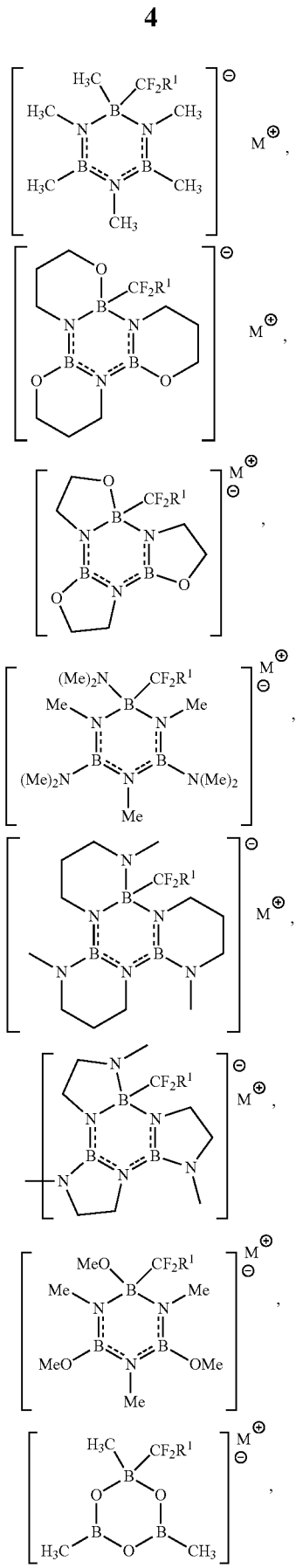

-continued

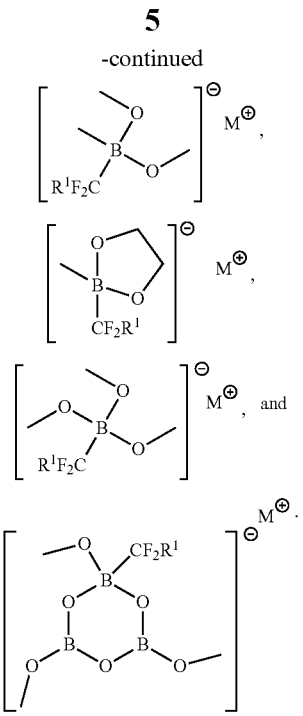

Further provided are compositions comprising any one of the compounds disclosed herein and a crown ether. In some cases, the crown ether is 18-crown-6.

Also provided are methods for preparing a compound disclosed herein comprising contacting H—$CF_2R^1$ with a Lewis acid, a base, and optionally a crown ether under conditions sufficient to form the compound or composition, wherein the Lewis acid has a structure:

(II)

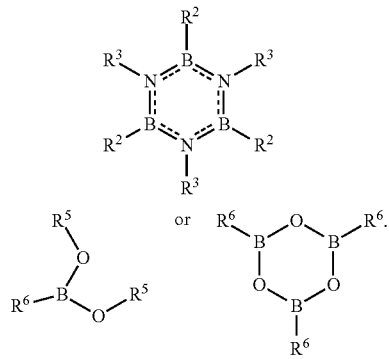

In embodiments, the base comprises an amide, a carbanion, or a mixture thereof. In some cases, the base comprises potassium bistrimethylsilylamide, potassium diisopropylamide, benzyl potassium, sodium bistrimethylsilylamide, sodium diisopropylamide, benzyl sodium, lithium diisopropylamide, lithium bistrimethylsilylamide, potassium diphenylmethanide, sodium diphenylmethanide, potassium diphenylmethylmethanide, sodium diphenylmethylmethanide, or a mixture thereof. In embodiments, the H—$CF_2R^1$ is selected from the group consisting of:

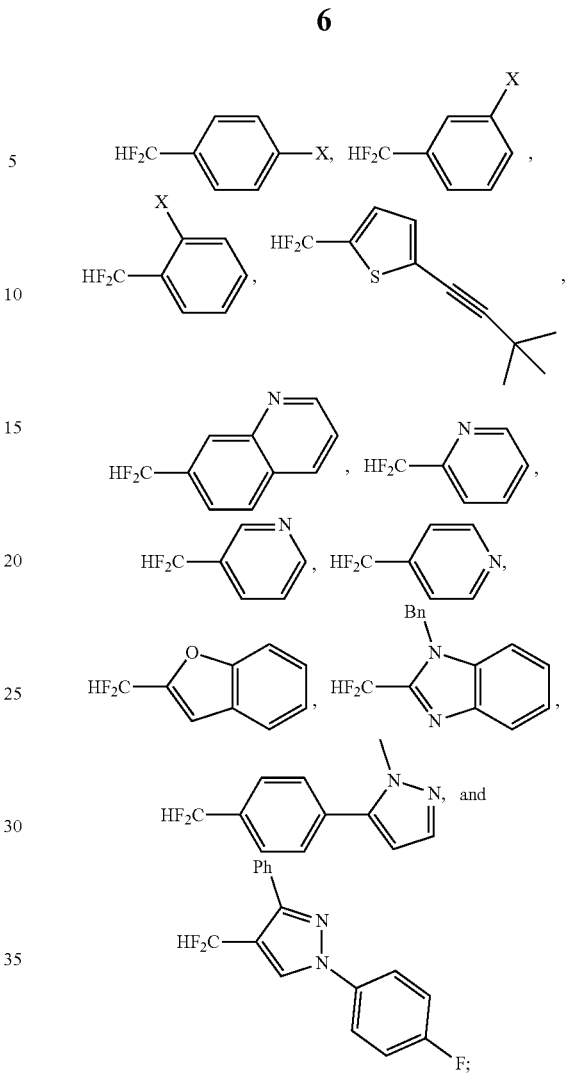

and

X is H, F, Cl, Br, I, $CH_3$, OH, $NH_2$, $NO_2$, $C_{1-4}$alkyl, $OC_{1-4}$alkyl, $CO_2H$, CHO, $CF_3$, or ON.

Further provided are methods of forming an aromatic difluorocarbon compound comprising admixing a compounds disclosed herein with an electrophile under conditions sufficient to couple the electrophile and $CF_2R^1$ to form the aromatic difluorocarbon compound. In embodiments, the admixing is performed in the presence of an oxidant. In some cases, the oxidant comprises benzoquinone or 2,3-dichloro-5,6-dicyano-1,4-benzoquinone ("DDQ"). In embodiments, the admixing is performed in the presence of a fluoride ion source. In some cases, the fluoride ion source comprises $NMe_4F$. In embodiments, the admixing is performed in the presence of a second Lewis acid to activate the electrophile. In cases, the second Lewis acid comprises $B(C_6F_5)_3$ or $BF_3$. In embodiments, the electrophile comprises a ketone, an aldehyde, a carboxylic acid, a pyridine, an aryl halide, an ester, a chalcone, an aryl isocyanate, a halogen, a sulfonyl halide, an imine, a disulfide, a nitroarene, a palladium cross-coupling reagent, a chromium aryl or heteroaryl reagent, an acyl chloride, sulfur dioxide, an elemental chalcogen (S, Se, or Te), carbon dioxide, dioxygen, or a mixture thereof. In embodiments, the electrophile is selected from the group consisting of:

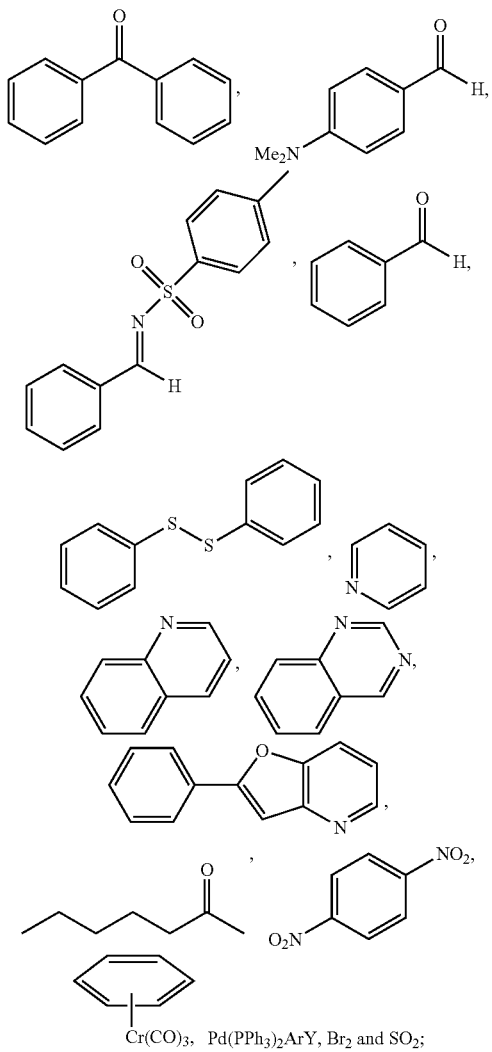

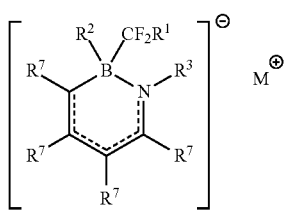

Y is F, Cl, Br, I, or a sulfonate; and Ar is $C_{6-20}$aryl or $C_{1-15}$heteroaryl, and the heteroaryl comprises 1-5 ring heteroatoms selected from N, O, and S. In some cases, the admixing is performed in the presence of a solvent. In embodiments, the solvent comprises tetrahydrofuran.

Further provided are compounds of Formula (III):

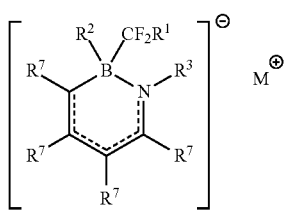

(III)

wherein: the dashed lines indicate optional double bonds; $R^1$ is H, $C_{6-20}$aryl, or $C_{1-15}$heteroaryl, and the heteroaryl comprises 1-5 ring heteroatoms selected from N, O, and S; $R^2$ and $R^3$ are independently OH, $N(R^4)_2$, $C_{1-6}$alkyl, $C_{3-8}$cycloalkyl, $OC_{1-6}$alkyl, or $OC_{3-8}$cycloalkyl, or $R^2$ and $R^3$, taken together with the atoms to which they are attached, form an optionally substituted 5-7 membered ring; each $R^4$ is independently $C_{1-6}$alkyl or $C_{3-8}$cycloalkyl; each $R^7$ is independently H, $C_{1-6}$alkyl, $C_{3-8}$cycloalkyl, or at least one adjacent $R^7$ pair, taken together with the atoms to which they are attached, form an optionally substituted 5-7 membered ring; and M comprises a counterion.

In embodiments, the compound of Formula (III) selected from the group consisting of:

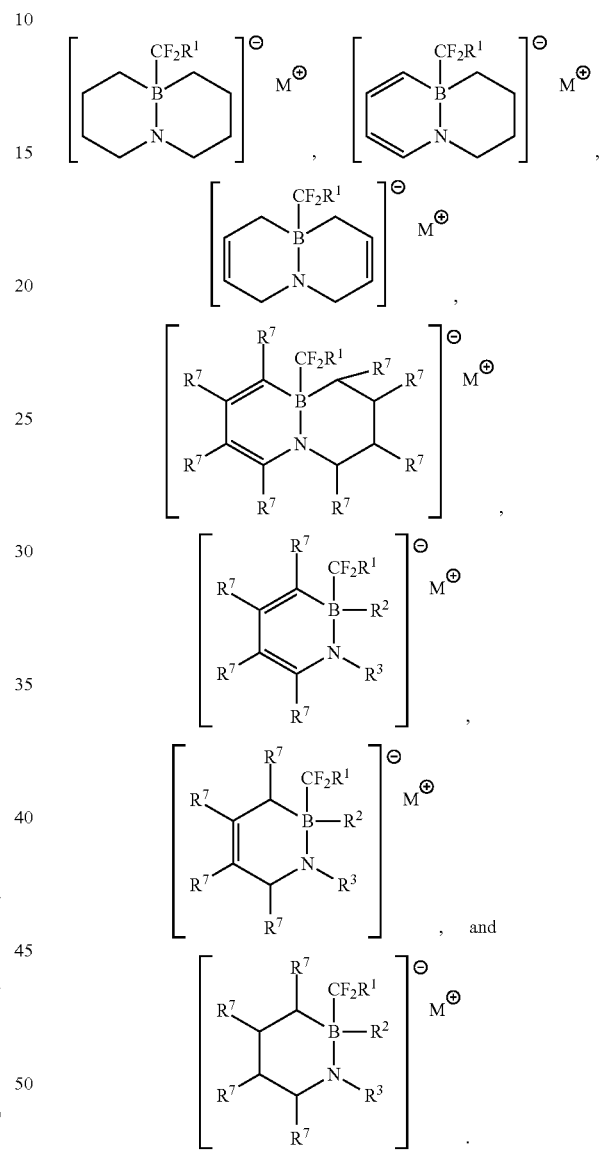

In embodiments, $R^1$ is H. In embodiments, $R^1$ is $C_{6-20}$aryl. In embodiments, $R^1$ is $C_{s_{15}}$heteroaryl. In embodiments, $R^1$ is selected from the group consisting of:

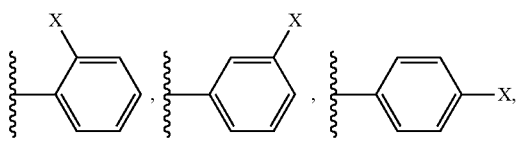

-continued

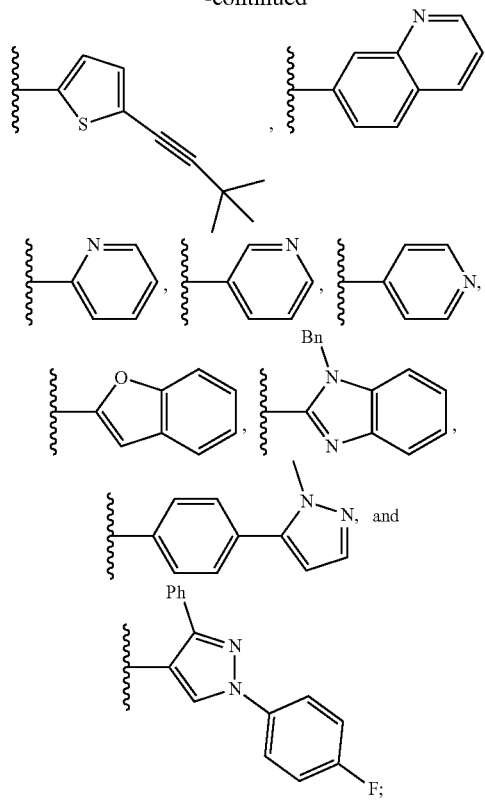

and

X is H, F, Cl, Br, I, $CH_3$, OH, $NH_2$, $NO_2$, $C_{1-4}$alkyl, $OC_{1-4}$alkyl, $CO_2H$, CHO, $CF_3$, or CN. In embodiments, at least one of $R^2$ and $R^3$ is $C_{1-6}$alkyl. In embodiments, at least one of $R^2$ and $R^3$ is methyl. In embodiments, each of $R^2$ and $R^3$ is methyl. In embodiments, M comprises Li, Na, K, Rb, Cs, or $NH_4$.

Also provided are compositions comprising a compound of Formula (III) as disclosed herein and a crown ether. In embodiments, the crown ether is 18-crown-6.

Further provided are methods for preparing the compound of Formula (III) or the composition thereof, comprising contacting $H—CF_2R^1$ with a Lewis acid, a base, and optionally a crown ether under conditions sufficient to form the compound or composition, wherein the Lewis acid has a structure:

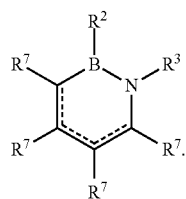

In embodiments, the base comprises an amide, a carbanion, or a mixture thereof. In embodiments, the base comprises potassium bistrimethylsilylamide, potassium diisopropylamide, benzyl potassium, sodium bistrimethylsilylamide, sodium diisopropylamide, benzyl sodium, lithium diisopropylamide, lithium bistrimethylsilylamide, potassium diphenylmethanide, sodium diphenylmethanide, potassium diphenylmethylmethanide, sodium diphenylmethylmethanide, or a mixture thereof. In embodiments, $H—CF_2R^1$ is selected from the group consisting of:

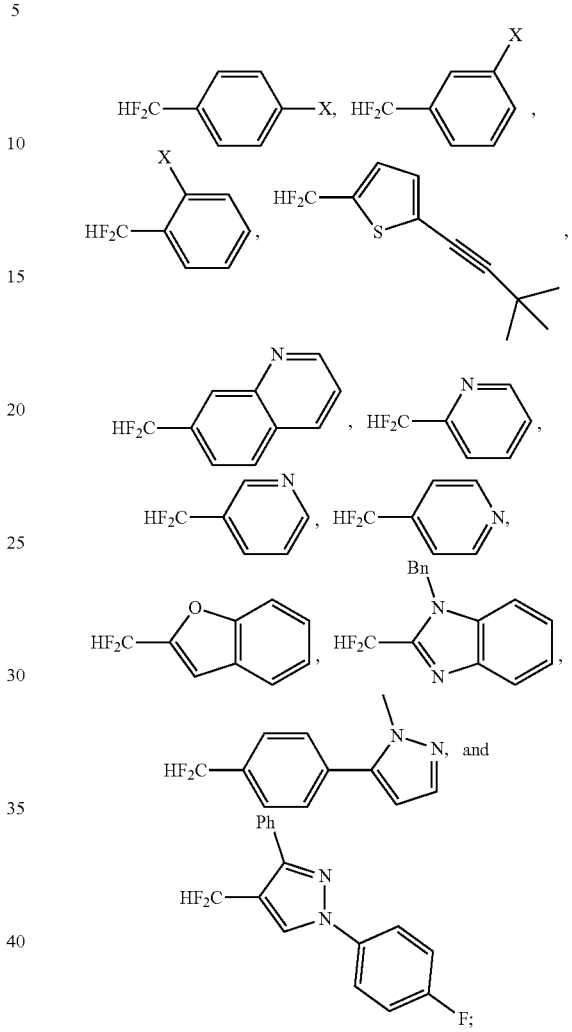

and

X is H, F, Cl, Br, I, $CH_3$, OH, $NH_2$, $NO_2$, $C_{1-4}$alkyl, $OC_{1-4}$alkyl, $CO_2H$, CHO, $CF_3$, or ON. In embodiments, the $HCF_2R^1$ is $CH_2F_2$.

Further provided are methods of forming a difluorocarbon compound comprising admixing the compound of Formula (III) or the composition thereof, with an electrophile under conditions sufficient to couple the electrophile and $CF_2R^1$ to form the aromatic difluorocarbon compound. In embodiments, the admixing is performed in the presence of an oxidant. In embodiments, the oxidant comprises benzoquinone or 2,3-dichloro-5,6-dicyano-1,4-benzoquinone. In embodiments, the admixing is performed in the presence of a fluoride ion source. In embodiments, the fluoride ion source comprises $NMe_4F$. In embodiments, the admixing is performed in the presence of a second Lewis acid to activate the electrophile. In embodiments, the second Lewis acid comprises $B(C_6F_5)_3$ or $BF_3$. In embodiments, the electrophile comprises a ketone, an aldehyde, a carboxylic acid, a pyridine, an aryl halide, an ester, a chalcone, an aryl isocyanate, a halogen, a sulfonyl halide, an imine, a disulfide, a nitroarene, a palladium cross-coupling reagent, a chromium aryl or heteroaryl reagent, an acyl chloride, sulfur dioxide, an elemental chalcogen (S, Se, or Te), carbon dioxide, dioxygen, or a mixture thereof. In embodiments, the electrophile is selected from the group consisting of:

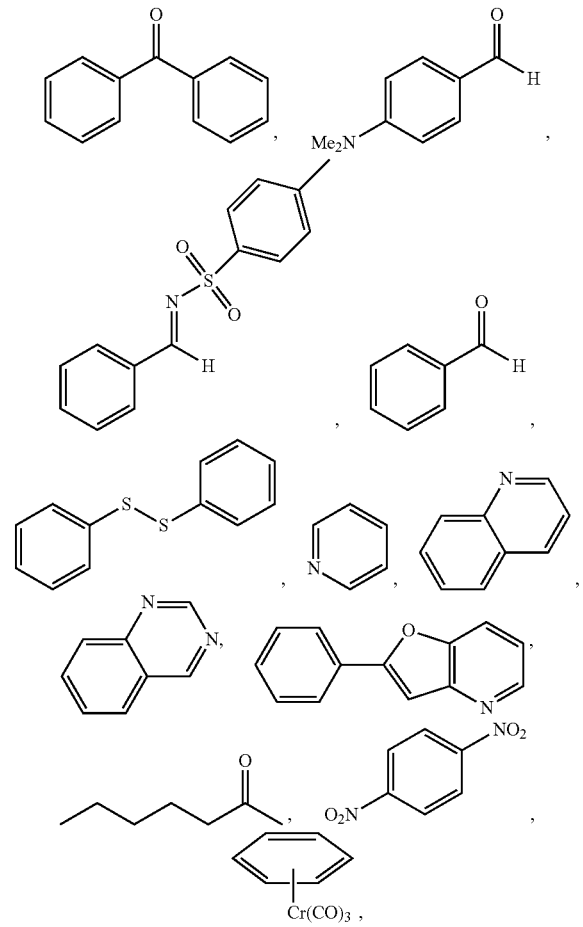

Pd(PPh$_3$)$_2$ArY, Br$_2$, and SO$_2$; Y is F, Cl, Br, I, or a sulfonate; and Ar is C$_{6-20}$aryl or C$_{1-15}$heteroaryl, and the heteroaryl comprises 1-5 ring heteroatoms selected from N, O, and S. In embodiments, wherein the admixing is performed in the presence of a solvent. In embodiments, the solvent comprises tetrahydrofuran.

DETAILED DESCRIPTION

Figure 1:
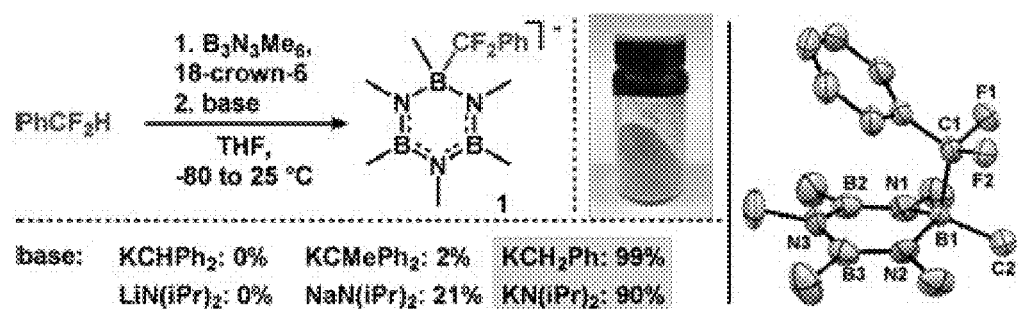
FIG. 1 shows the synthesis of [K(18-crown-6)][PhCF$_2$—B$_3$N$_3$Me$_6$]. The 18-crown-6molecule is omitted for clarity.

Provided herein are borazine, borate, and azaborinine compounds and compositions thereof, as well as methods of making said compounds or compositions thereof and methods of forming difluorocarbon compounds using these compounds or compositions. Disclosed herein are borazine compounds of Formula (I) and compositions thereof:

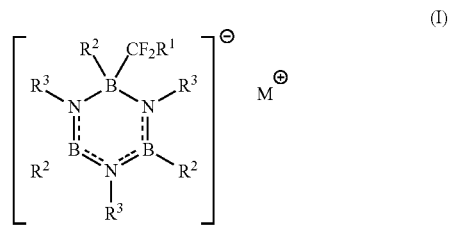 (I)

wherein: the dashed lines indicate optional double bonds; R$^1$ is C$_{6-20}$aryl or C$_{1-15}$heteroaryl, and the heteroaryl comprises 1-5 ring heteroatoms selected from N, O, and S; each R$^2$ and R$^3$ is independently OH, N(R$^4$)$_2$, C$_{1-6}$alkyl, C$_{3-8}$cycloalkyl, OC$_{1-6}$alkyl, or OC$_{3-8}$cycloalkyl; or adjacent R$^2$ and R$^3$, taken together with the atoms to which they are attached, form an optionally substituted 5-7 membered ring; each R$^4$ is independently C$_{1-6}$alkyl or C$_{3-8}$cycloalkyl; and M comprises a counterion.

Also disclosed herein are borate compounds having a structure of:

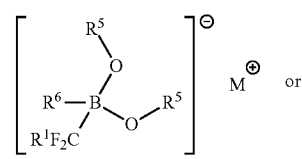 or

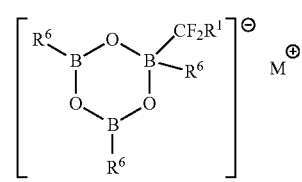

and compositions thereof, wherein: R$^1$ is C$_{6-20}$aryl or C$_{1-15}$heteroaryl, and the heteroaryl comprises 1-5 ring heteroatoms selected from N, O, and S; each R$^5$ is independently C$_{1-6}$alkyl, C$_{3-8}$cycloalkyl; or each R$^5$ taken together with the atoms to which they are attached form an optionally substituted 5-7 membered ring; each R$^6$ is independently C$_{1-6}$alkyl, C$_{3-8}$cycloalkyl, OC$_{1-6}$alkyl, or OC$_{3-8}$cycloalkyl; and M comprises a counterion.

Further disclosed herein are azaborinine compounds of Formula (III):

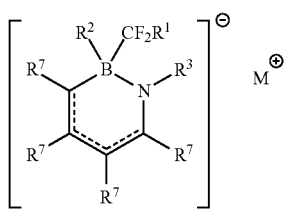

and compositions thereof, wherein: the dashed lines indicate optional double bonds; $R^1$ is H, $C_{6-20}$aryl, or $C_{1-15}$heteroaryl, and the heteroaryl comprises 1-5 ring heteroatoms selected from N, O, and S; $R^2$ and $R^3$ are independently OH, $N(R^4)_2$, $C_{1-6}$alkyl, $C_{3-8}$cycloalkyl, $OC_{1-6}$alkyl, or $OC_{3-8}$cycloalkyl, or $R^2$ and $R^3$, taken together with the atoms to which they are attached, form an optionally substituted 5-7 membered ring; each $R^4$ is independently $C_{1-6}$alkyl or $C_{3-8}$cycloalkyl; each $R^7$ is independently $C_{1-6}$alkyl or $C_{3-8}$cycloalkyl or at least one adjacent $R^7$ pair, taken together with the atoms to which they are attached, form an optionally substituted 5-7 membered ring; and M comprises a counterion.

As used herein, the term "alkyl" refers to straight chained and branched saturated hydrocarbon groups. The term $C_n$ means the alkyl group has "n" carbon atoms. For example, $C_4$ alkyl refers to an alkyl group that has 4 carbon atoms. $C_1$-$C_6$ alkyl refers to an alkyl group having a number of carbon atoms encompassing the entire range (i.e., 1 to 6 carbon atoms), as well as all subgroups (e.g., 1-6, 2-6, 1-5, 3-6, 1, 2, 3, 4, 5, and 6 carbon atoms). Nonlimiting examples of alkyl groups include, methyl, ethyl, n-propyl, isopropyl, n-butyl, sec-butyl, and t-butyl. Unless otherwise indicated, an alkyl group can be an unsubstituted alkyl group or a substituted alkyl group.

As used herein, the term "cycloalkyl" refers to an aliphatic cyclic hydrocarbon group. The term $C_n$ means the cycloalkyl group has "n" carbon atoms. For example, $C_5$ cycloalkyl refers to a cycloalkyl group that has 5 carbon atoms in the ring. $C_3$-$C_8$ cycloalkyl refers to cycloalkyl groups having a number of carbon atoms encompassing the entire range (i.e., 3 to 8 carbon atoms), as well as all subgroups (e.g., 3-7, 3-6, 3-5, 3-4, 4-8, 4-7, 4-6, 4-5, 5-6, 6-8, 7-8, 5-7, 3, 4, 5, 6, 7, and 8 carbon atoms). Nonlimiting examples of cycloalkyl groups include cyclopropyl, cyclobutyl, cyclopentyl, cyclohexyl, cycloheptyl, and cyclooctyl. Unless otherwise indicated, a cycloalkyl group can be an unsubstituted cycloalkyl group or a substituted cycloalkyl group. The cycloalkyl groups described herein can be isolated or fused to another cycloalkyl group, a heterocycloalkyl group, an aryl group and/or a heteroaryl group.

As used herein, the term "aryl" refers to monocyclic or polycyclic (e.g., fused bicyclic and fused tricyclic) carbocyclic aromatic ring systems. The term $C_n$ means the aryl group has "n" carbon atoms. For example, $C_6$ aryl refers to an aryl group that has 6 carbon atoms in the ring. $C_6$-$C_{20}$ aryl refers to aryl groups having a number of carbon atoms encompassing the entire range (i.e., 6 to 20 carbon atoms), as well as all subgroups (e.g., 6-7, 7-9, 9-10, 6-8, 6, 7, 8, 9, 10, 11, 12, 13, 14, 15, 16, 17, 18, 19 and 20 carbon atoms). Examples of aryl groups include, but are not limited to, phenyl, naphthyl, tetrahydronaphthyl, phenanthrenyl, biphenylenyl, indanyl, indenyl, anthracenyl, and fluorenyl. Unless otherwise indicated, an aryl group can be an unsubstituted aryl group or a substituted aryl group.

As used herein, the term "heteroaryl" refers to monocyclic or polycyclic (e.g., fused bicyclic and fused tricyclic) aromatic ring systems, wherein one to five ring atoms are selected from oxygen, nitrogen, and sulfur, and the remaining ring atoms are carbon, said ring system being joined to the remainder of the molecule by any of the ring atoms. The term $C_n$ means the aryl group has "n" carbon atoms. For example, $C_4$ heteroaryl refers to a heteroaryl group that has 4 carbon atoms in the ring. $C_1$-$C_{15}$ heteroaryl refers to heteroaryl groups having a number of carbon atoms encompassing the entire range (i.e., 1 to 15 carbon atoms), as well as all subgroups (e.g., 2-3, 3-4, 2-4, 2, 3, and 4 carbon atoms). Nonlimiting examples of heteroaryl groups include, but are not limited to, pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl. Unless otherwise indicated, a heteroaryl group can be an unsubstituted heteroaryl group or a substituted heteroaryl group.

As used herein, the term "substituted," when used to modify a chemical functional group, refers to the replacement of at least one hydrogen radical on the functional group with a substituent. Substituents can include, but are not limited to, alkyl, cycloalkyl, alkenyl, cycloalkenyl, alkynyl, heterocycloalkyl, ether, polyether, thioether, polythioether, aryl, heteroaryl, hydroxyl, oxy, alkoxy, heteroalkoxy, aryloxy, heteroaryloxy, ester, thioester, carboxy, cyano, nitro, amino, amido, acetamide, and halo (e.g., fluoro, chloro, bromo, or iodo). When a chemical functional group includes more than one substituent, the substituents can be bound to the same carbon atom or to two or more different carbon atoms. A substituted chemical functional group can itself include one or more substituents.

The $R^1CF_2^-$ transfer reagents described herein can be used for direct retrosynthetic disconnection of the $R^1CF_2$—R bond, which will enable facile construction of compounds containing this functionality by providing a route in which a nucleophilic $R^1CF_2^-$ functionality is reacted directly with an electrophile. Given the utility of this functionality within medicinal chemistry, such capabilities will yield significant advantages in terms of metabolic stability for the discovery of novel therapeutic lead compounds. Further advantages include: a broader scope of reactivity, safer reagents and side products, and more selective reactivity.

Described herein is a general approach for the conversion of common difluoromethyl containing compounds into stabilized, structurally diverse, and previously inaccessible $R^1CF_2^-$ transfer reagents. The reagents are highly reactive, transferring $R^1CF_2^-$ to a wide variety of organic electrophiles to form $R^1CF_2$—C bonds. The use of difluoromethyl groups as sources of $R^1CF_2^-$ will facilitate the introduction of difluoromethylene linkages as easily accessible functional groups that will find applications in drug discovery.

Existing methodologies for the construction of Ar—$CF_2$—R (wherein Ar is any aromatic group) linkages require reagents that are toxic, explosive, and of highly limited scope. The most common retrosynthetic disconnection is at the C—F bonds of the $CF_2$ unit through ketone deoxyfluorination using trifluorosulfuranes (e.g. DAST; $Et_2NSF_3$) and radical fluorination of C—H bonds (Xia et al., *Journal of the American Chemical Society*, 2013, 135, 17494-17500). However, each of these strategies present significant challenges. Unlike aldehydes, deoxyfluorination of ketones with DAST is unreliable and the forcing conditions required generate explosive difluorosulfurane byproducts. Radical C—H fluorination is more attractive, but the promiscuous reactivity of radical F (F.) leads to low functional group tolerance. In a recent industrial synthesis of a thrombin inhibitor containing an Ar—$CF_2$—R linkage, significant effort was expended to avoid these routes and ultimately the molecule was built outward from bromodifluoroacetate.

A more desirable disconnection is at the $ArCF_2$—C bond, but only electrophilic $ArCF_2^+$ and radical $ArCF_2$. based disconnections are currently practical, yet present significant limitations: electrophilic $ArCF_2Br$ starting materials are largely unavailable, radical cross-coupling between sulfone (R—$CF_2$—$SO_2R$) electrophiles and organozinc nucleophiles is limited to aliphatic $RCF_2$ transfer, and generation of Ar—$CF_2$. from Ar—$CF_3$ requires strong reductants and the reported scope in radicalphile is limited. Compared to electrophilic and radical methodologies, disconnections using $ArCF_2^-$ synthons remain underdeveloped despite the wide availability of C-electrophilic (Ar—X, wherein X is any suitable leaving group; carbonyl; or imine) functional groups. $ArCF_2SiMe_3$ reagents are the only access point to this reactivity manifold, but synthetic routes to these reagents are highly limited in scope.

In contrast to the poor availability of $ArCF_2SiMe_3$ pronucleophiles, aromatic difluoromethyl compounds ($ArCF_2H$) could be ideal, masked $ArCF_2$ nucleophiles upon deprotonation. Recent progress in transition metal catalyzed difluoromethylation has made these compounds easily accessible and structurally diverse starting materials. However, the weak acidity of $ArCF_2H$ groups (no reaction with $KN(SiMe_3)_2$) and the instability of $ArCF_2$ groups to α-fluoride elimination has prevented the realization of this approach. Provided herein is the forming of aromatic difluorocarbon compounds ($R^1$—$CF_2$—R) starting from $R^1CF_2H$ and diverse electrophiles.

Further, a combined experimental and theoretical approach was used to discover a Bronsted base/Lewis acid pair capable of $CF_2H_2$ deprotonation and $CF_2H^-$ capture. Important requirements for the base includes a high degree of steric bulk, to ensure compatibility with a wide range of Lewis acids, sufficient basicity to deprotonate weakly acidic $CF_2H_2$, and a lack of fluorophilic $Li^+$ or $Na^+$ countercations. A library of boron-based Lewis acids was screened with computed $CF_2H^-$ affinities ranging from 8 to 32 kcal/mol for experimental evaluation. The high $CF_2H^-$ affinity of the Lewis acids present a higher barrier to dissociative $CF_2H^-$ transfer than for related $CF_3^-$ transfer ($CF_2H^-$ vs. $CF_3^-$ affinity of $B_3N_3Me_6$: −31 vs. −22 kcal/mol).

The use of the terms "a," "an," "the," and similar referents in the context of the disclosure herein (especially in the context of the claims) are to be construed to cover both the singular and the plural, unless otherwise indicated. Recitation of ranges of values herein merely are intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended to better illustrate the disclosure herein and is not a limitation on the scope of the disclosure herein unless otherwise indicated. No language in the specification should be construed as indicating any non-claimed element as essential to the practice of the disclosure herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

Borazine and Borate Compounds and Compositions

Provided herein is a compound of Formula (I):

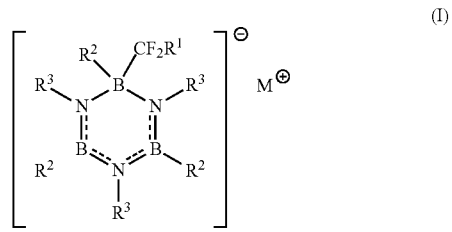

wherein:
the dashed lines indicate optional double bonds;
$R^1$ is $C_{6-20}$aryl or $C_{1-15}$heteroaryl, and the heteroaryl comprises 1-5 ring heteroatoms selected from N, O, and S;
each $R^2$ and $R^3$ is independently OH, $N(R^4)_2$, $C_{1-6}$alkyl, $C_{3-8}$cycloalkyl, $OC_{1-6}$alkyl, or $OC_{3-8}$cycloalkyl; or adjacent $R^2$ and $R^3$, taken together with the atoms to which they are attached, form an optionally substituted 5-7 membered ring;
each $R^4$ is independently $C_{1-6}$alkyl or $C_{3-8}$cycloalkyl; and
M comprises a counterion.

In various cases, $R^1$ is $C_{6-20}$aryl, for example, $C_{6-16}$aryl (e.g., $C_6$aryl, $C_{10}$aryl, $C_{12}$aryl, $C_{14}$aryl, or $C_{1-6}$aryl). In various embodiments, $R^1$ is phenyl, biphenyl, naphthyl, phenanthrenyl, anthracenyl or pyrenyl. In various embodiments, $R^1$ is phenyl. In some cases, $R^1$ is $C_{1-15}$heteroaryl and the heteroaryl can comprises 1-5 ring heteroatoms selected from N, O, and S, for example, $C_{2-9}$heteroaryl (e.g., $C_2$heteroaryl, $C_3$heteroaryl, $C_4$heteroaryl, $C_5$heteroaryl, $C_6$heteroaryl, $C_7$heteroaryl, $C_8$heteroaryl, or $C_9$heteroaryl). In some embodiments, $R^1$ is pyridyl, pyrazinyl, pyrimidinyl, pyrrolyl, pyrazolyl, pyrazinyl, indolyl, imidazolyl, thiazolyl, thiaphenyl, tetrazolyl, oxazolyl, isooxazolyl, thiadiazolyl, oxadiazolyl, furanyl, benzofuranyl, quinolinyl, isoquinolinyl, benzoxazolyl, benzimidazolyl or benzothiazolyl. In some embodiments, $R^1$ comprises $C_{6-20}$aryl or $C_{1-15}$heteroaryl, wherein the aryl group or heteroaryl group can be substituted with one or more substituent. In various cases, $R^1$ comprises $C_{6-20}$aryl or $C_{1-15}$heteroaryl, wherein the aryl group or heteroaryl group is monosubstituted. In various cases, $R^1$ comprises $C_{6-20}$aryl or $C_{1-15}$heteroaryl, wherein the aryl group or heteroaryl group is disubstituted. In some embodiments, $R^1$ comprises $C_{6-20}$aryl or $C_{1-15}$heteroaryl, wherein the aryl group or heteroaryl group is substituted with one or more of halo (e.g., fluoro, chloro, bromo, iodo, or a combination thereof), $C_{1-4}$ alkyl (e.g., methyl, trifluoromethyl, ethyl, propyl, isopropyl, n-butyl, isobutyl, sec-butyl, tert-butyl, or a combination thereof), $C_{1-4}$ alkoxyl (e.g., methoxyl, trifluoromethoxyl, ethoxyl, n-propoxyl, isopropoxyl, n-butoxyl, isobutoxyl, sec-butoxyl, tert-butoxyl, or a combination thereof), $C_{2-8}$ alkenyl, $C_{2-8}$ alkynyl, OH, $NH_2$, $NO_2$, $CO_2H$, CHO, $CF_3$, CN, or a combination thereof. In embodiments, $R^1$ comprises

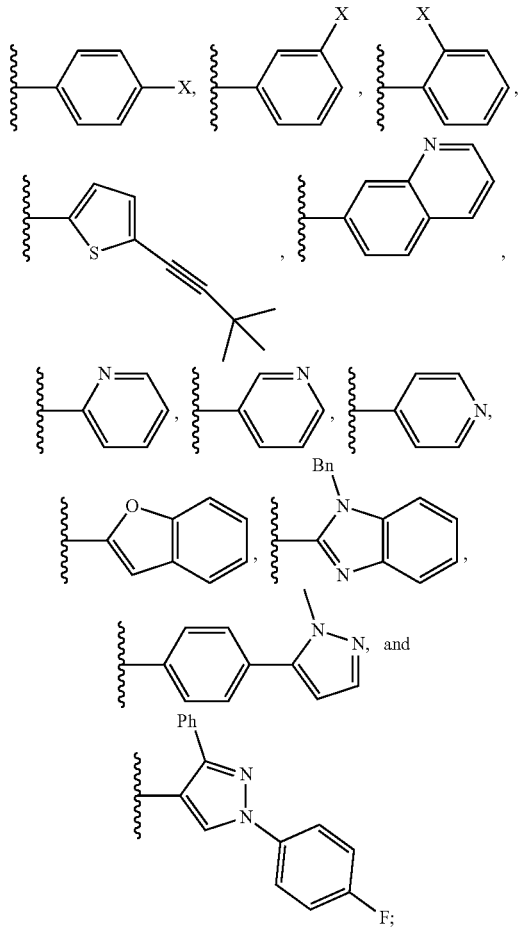

and

X is H, F, Cl, Br, I, $CH_3$, OH, $NH_2$, $NO_2$, $C_{1-4}$alkyl, $OC_{1-4}$alkyl, $CO_2H$, CHO, $CF_3$, or CN.

In some embodiments, at least one $R^2$ or $R^3$ is OH. In some embodiments, each of $R^2$ and $R^3$ is OH. In embodiments, at least one $R^2$ or $R^3$ is $N(R^4)_2$, wherein $R^4$ is independently $C_{1-6}$alkyl or $C_{3-8}$cycloalkyl. In embodiments, each $R^2$ and $R^3$ is $N(R^4)_2$, wherein $R^4$ is independently $C_{1-6}$alkyl or $C_{3-8}$cycloalkyl. In embodiments, at least one of $R^2$ or $R^3$ is $C_{1-6}$alkyl, for example, $C_{1-4}$ alkyl (e.g., methyl, ethyl, n-propyl, isopropyl, n-butyl, isobutyl, sec-butyl, or tert-butyl), or $C_{5-6}$ alkyl (e.g., $C_5$ alkyl or $C_6$ alkyl). In various embodiments, each $R^2$ and $R^3$ is $C_{1-6}$alkyl, for example, $C_{1-4}$ alkyl (e.g., methyl, ethyl, n-propyl, isopropyl, n-butyl, isobutyl, sec-butyl, or tert-butyl), or $C_{5-6}$ alkyl (e.g., $C_5$ alkyl or $C_6$ alkyl). In some embodiments, at least one of $R^2$ or $R^3$ is methyl. In some embodiments, each of $R^2$ and $R^3$ is methyl. In some embodiments, at least one $R^2$ or $R^3$ is $C_{3-8}$cycloalkyl (e.g., cyclopropyl, cyclobutyl, cyclopentyl, cyclohexyl, cycloheptyl, or cyclooctyl). In some embodiments, each $R^2$ and $R^3$ is $C_{3-8}$cycloalkyl (e.g., cyclopropyl, cyclobutyl, cyclopentyl, cyclohexyl, cycloheptyl, or cyclooctyl). The cycloalkyl can be an isolated hydrocarbon ring or fused to a cycloalkyl group, a heterocycloalkyl group, an aryl group, a heteroaryl group, or a combination thereof. In embodiments, at least one of $R^2$ or $R^3$ is $OC_{1-6}$alkyl, for example, $OC_{1-4}$ alkyl (e.g., $OC_1$alkyl, $OC_2$alkyl, $OC_3$alkyl, and $OC_4$alkyl), or $OC_{5-6}$ alkyl (e.g., $OC_5$ alkyl or $OC_6$ alkyl). In various embodiments, each of $R^2$ and $R^3$ is $OC_{1-6}$alkyl, for example, $OC_{1-4}$ alkyl (e.g., $OC_1$alkyl, $OC_2$alkyl, $OC_3$alkyl, and $OC_4$alkyl), or $OC_{5-6}$ alkyl (e.g., $OC_5$ alkyl or $OC_6$ alkyl). In some cases, at least one adjacent $R^2$ and $R^3$, taken together with the atoms to which they are attached, form an optionally substituted 5-7 membered ring. In various embodiments, each of the adjacent $R^2$ and $R^3$, taken together with the atoms to which they are attached, form an optionally substituted 5-7 membered ring.

Also disclosed herein is a compound having a structure of:

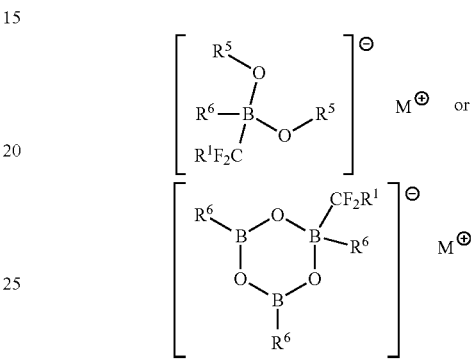

wherein:

$R^1$ is $C_{6-20}$aryl or $C_{1-15}$heteroaryl, and the heteroaryl comprises 1-5 ring heteroatoms selected from N, O, and S; each $R^5$ is independently $C_{1-6}$alkyl, $C_{3-8}$cycloalkyl; or each $R^5$ taken together with the atoms to which they are attached form an optionally substituted 5-7 membered ring; each $R^6$ is independently $C_{1-6}$alkyl, $C_{3-8}$cycloalkyl, $OC_{1-6}$alkyl, or $OC_{3-8}$cycloalkyl; and M comprises a counterion.

In embodiments, at least one of $R^5$ or $R^6$ is $C_{1-6}$alkyl, for example, $C_{1-4}$ alkyl (e.g., methyl, ethyl, n-propyl, isopropyl, n-butyl, isobutyl, sec-butyl, or tert-butyl), or $C_{5-6}$ alkyl (e.g., $C_5$ alkyl or $C_6$ alkyl). In various embodiments, each $R^5$ and/or $R^6$ is $C_{1-6}$alkyl, for example, $C_{1-4}$ alkyl (e.g., methyl, ethyl, n-propyl, isopropyl, n-butyl, isobutyl, sec-butyl, or tert-butyl), or $C_{5-6}$ alkyl (e.g., $C_5$ alkyl or $C_6$ alkyl). In some embodiments, at least one of $R^5$ or $R^6$ is methyl. In some embodiments, each of $R^5$ and/or $R^6$ is methyl. In some embodiments, at least one $R^5$ or $R^6$ is $C_{3-8}$cycloalkyl (e.g., cyclopropyl, cyclobutyl, cyclopentyl, cyclohexyl, cycloheptyl, or cyclooctyl). In some embodiments, each $R^5$ and/or $R^6$ is $C_{3-8}$cycloalkyl (e.g., cyclopropyl, cyclobutyl, cyclopentyl, cyclohexyl, cycloheptyl, or cyclooctyl). The cycloalkyl can be an isolated hydrocarbon ring or fused to a cycloalkyl group, a heterocycloalkyl group, an aryl group, a heteroaryl group, or a combination thereof. In embodiments, at least one $R^6$ is $OC_{1-6}$alkyl, for example, $OC_{1-4}$ alkyl (e.g., $OC_1$alkyl, $OC_2$alkyl, $OC_3$alkyl, and $OC_4$alkyl), or $OC_{5-6}$ alkyl (e.g., $OC_5$ alkyl or $OC_6$ alkyl). In various embodiments, each $R^6$ is $OC_{1-6}$alkyl, for example, $OC_{1-4}$ alkyl (e.g., $OC_1$alkyl, $OC_2$alkyl, $OC_3$alkyl, and $OC_4$alkyl), or $OC_{5-6}$ alkyl (e.g., $OC_5$ alkyl or $OC_6$ alkyl). In some cases, each adjacent $R^5$ taken together with the atoms to which they are attached, form an optionally substituted 5-7 membered ring.

The M of the compounds disclosed above can be any suitable counterion to one of skill in the art. In embodiments, M is a cation. In embodiments, M is a cation of lithium, sodium, potassium, rubidium, caesium, or a mixture thereof. In embodiments, M is a cation of potassium.

For example, the borazine or borate compounds disclosed herein can have a structure selected from the group consisting of:

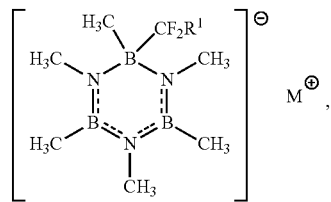

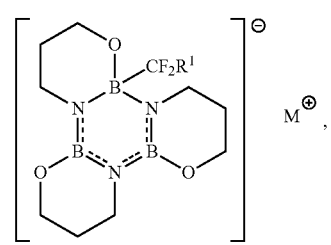

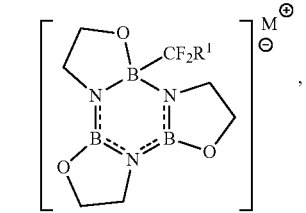

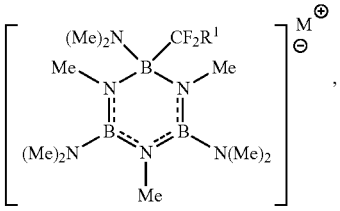

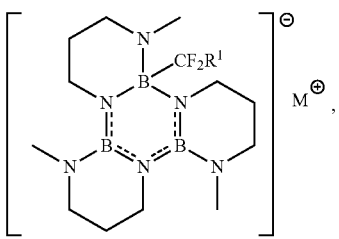

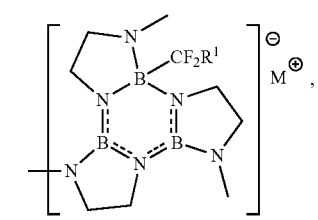

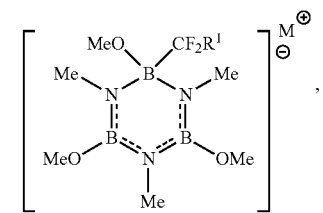

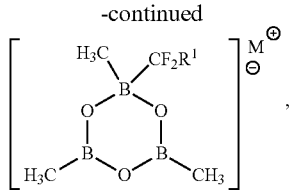

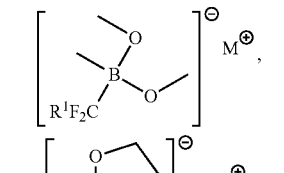

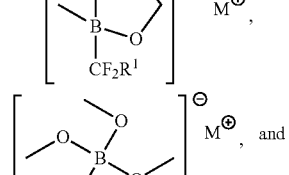

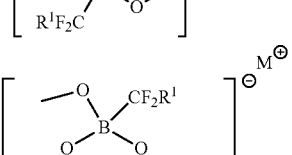

, and

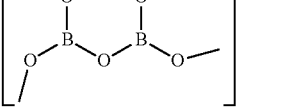

Also, provided herein is a composition comprising the borazine or borate compounds described herein and a crown ether. The crown ether can be any suitable crown ether to one of skill in the art. In embodiments, the crown ether can be 18-crown-6, 15-crown-5, 12-crown-4, dibenzo-18-crown-6, diaza-18-crown-6, or a mixture thereof. In embodiments, the crown ether is 18-crown-6.

Methods of Preparing the Borazine or Borate Compounds and Compositions

Provided herein are methods of preparing the borazine or borate compounds or compositions thereof, comprising contacting H—$CF_2R^1$ with a Lewis acid, a base, and optionally a crown ether under conditions sufficient to form the compound or composition, wherein the Lewis acid has a structure:

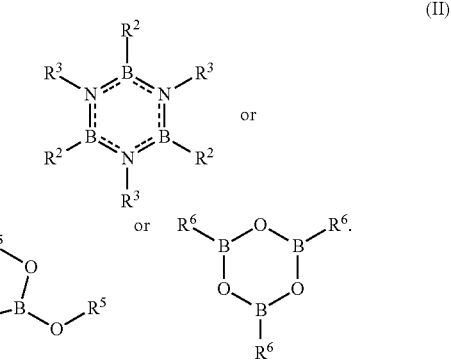

(II)

The substituents $R^1$ of the H—$CF_2R^1$ and $R^2$, $R^3$, $R^5$, and $R^6$ of the Lewis acids above can be the same $R^1$, $R^2$, $R^3$, $R^5$ and $R^6$ of the borazine and borate compounds or compositions described above. In embodiments, at least one of $R^2$, $R^3$, $R^5$ and $R^6$ of the Lewis acid is methyl. In embodiments, each of $R^2$, $R^3$, $R^4$, $R^5$ and $R^6$ of the Lewis acid is methyl. In embodiments, $R^1$ can be $C_{6-20}$aryl or $C_{1-15}$heteroaryl.

In embodiments, the $H—CF_2R^1$ is selected from the group consisting of:

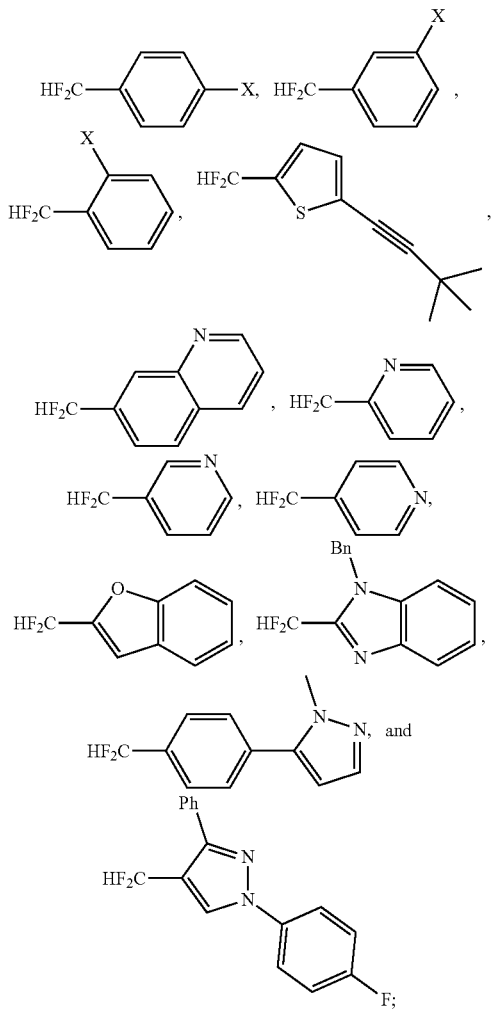

and

X is H, F, Cl, Br, I, $CH_3$, OH, $NH_2$, $NO_2$, $C_{1-4}$alkyl, $OC_{1-4}$alkyl, $CO_2H$, CHO, $CF_3$, or CN.

The method herein can comprise any suitable base for the deprotonation of a $R^1CF_2$—H compound. In embodiments, the base can comprise an amide, a carbanion, a hydride, an alkoxide, or a mixture thereof. As used herein, the term "carbanion" is referred to as any anionic carbon atom such as organolithiums, Grinard reagents, and other metal alkyls, for example, benzyl potassium. In embodiments, the base can comprise an amide, a carbanion, or a mixture thereof. In embodiments, the base can comprise potassium bistrimethylsilylamide, potassium diisopropylamide, benzyl potassium, sodium bistrimethylsilylamide, sodium diisopropylamide, benzyl sodium, lithium diisopropylamide, lithium bistrimethylsilylamide, potassium diphenylmethanide, sodium diphenylmethanide, potassium diphenylmethylmethanide, sodium diphenylmethylmethanide, or a mixture thereof.

Without intending to be bound by theory, three key requirements can be met to transform $H—CF_2R^1$ into useful $R^1CF_2^-$ synthons using Bronsted base/Lewis acid pairs: (1) the base used for C—H deprotonation must be sufficiently strong, (2) the Lewis acid must be capable of reversible $R^1CF_2^-$ capture to facilitate subsequent reactions with electrophiles, and (3) the Lewis acid must not irreversibly bind the Bronsted base. The term "$R^1CF_2^-$ synthons" can comprise compounds or compositions of Formula (I) described herein. For example, while pKa measurements for $R^1CF_2$—H bonds are unavailable, the base, $MCH_2Ph$ (wherein M is $K^+$), was thought to be capable of deprotonating $HCF_2R$ satisfying criterion (1). Using a computational methodology, described in WO 2017/223406, $B_3N_3Me_6$ has a $PhCF_2$ affinity of −23.3 kcal/mol (−22.6 kcal/mol for $CF_3^-$), suggesting that $B_3N_3Me_6$ could serve an appropriate Lewis acid for stabilization and transfer of $PhCF_2^-$, satisfying criterion (2). Additionally, $KCH_2Ph$ forms a reversible adduct with the weak Lewis acid hexamethylborazine ($B_3N_3Me_6$), satisfying criterion (3) (Geri et. al, *Angewandte Chemie International Edition*, 57, 1381-1385, 2018).

In various embodiments, the contacting or reacting occurs in a polar, aprotic solvent such as, dichloromethane, tetrahydrofuran, ethyl acetate, acetone, N,N-dimethylformamide, acetonitrile, dimethyl sulfoxide, N-methylpyrrolidone, propylene carbonate, hexamethylphosphoramide, and sulfolane. In embodiments, the contacting or reacting occurs in any suitable ether, such as tetrahydrofuran. In embodiments, the contacting or reacting occurs in tetrahydrofuran. In embodiments, the contacting and/or reacting is at a temperature of −110° C. to 50° C., such as −110° C., −100° C., −90° C., −80° C., −70° C., −60° C., −50° C., −40° C., −30° C., −20° C., −10° C., 0° C., 5° C., 10° C., 15° C., 20° C., 25° C., 30° C., 35° C., 40° C., 45° C., and 50° C. In embodiments, the contacting and/or reacting is at a temperature of −80° C. to 25° C. during the course of the contacting and/or reacting. In embodiments, the contacting and/or reacting is increasing in temperature, starting from −80° C. and ending at 25° C. during the course of the contacting and/or reacting, wherein the temperature at any point during the reaction can be −80° C. to 25° C.

Methods of Forming Aromatic Difluorocarbon Compounds

Provided herein is a method of forming an aromatic difluorocarbon compound comprising admixing the borazine or borate compound or the composition thereof disclosed above, with an electrophile under conditions sufficient to couple the electrophile and $R^1CF_2^-$ to form the aromatic difluorocarbon compound.

As used herein, the term "aromatic difluorocarbon compound" refers to a compound comprising $R^1CF_2^-$, wherein $R^1$ is an aromatic group and the $CF_2$— is further substituted. For example, an aromatic difluorocarbon compound can comprise $R^1CF_2$—SPh, $R^1CF_2$—C(OH)Ph$_2$, $R^1CF_2$—Py, any of the $R^1CF_2$—R compounds disclosed herein, or any other suitable substituents.

The method herein can comprise the same $R^1$, $R^2$, $R^3$, $R^4$, $R^5$, and $R^6$ of the compounds or compositions described above.

The electrophile of the method of forming an aromatic difluorocarbon compound can comprise any suitable electrophile to couple said electrophile and $R^1CF_2$. In embodiments, the electrophile can comprise an epoxide, an aziridine, an allene, an alkyl halide, an acyl halide, a carbene, a borane, a ketone, an aldehyde, a carboxylic acid, a pyridine, an aryl halide, an ester, a chalcone, an aryl isocyanate, a halogen, a sulfonyl, an imine, a disulfide, a nitroarene, a palladium cross-coupling reagent, a chromium aryl or heteroaryl reagent, an acyl chloride, sulfur dioxide, an elemental chalcogen (S, Se, or Te), carbon dioxide, dioxygen, or a mixture thereof.

In embodiments, the electrophile can be selected from the group consisting of:

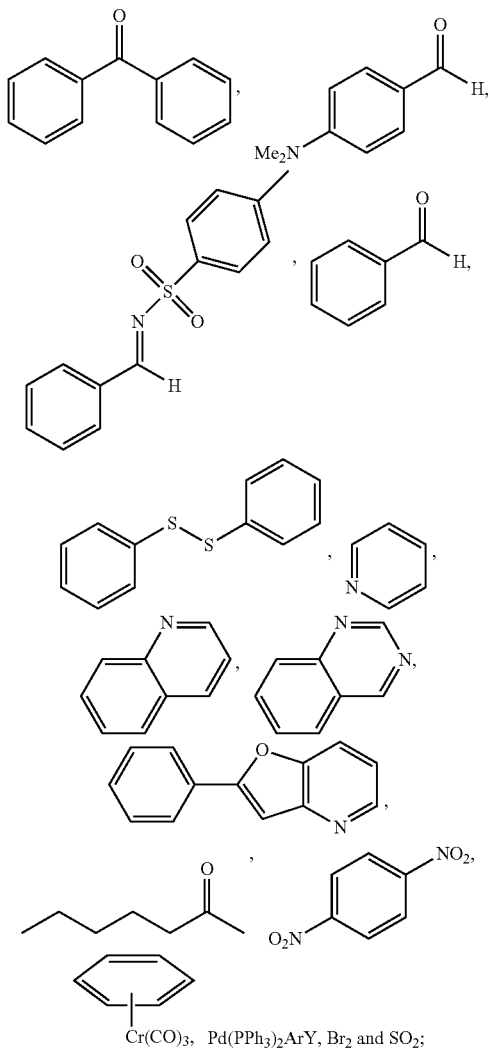

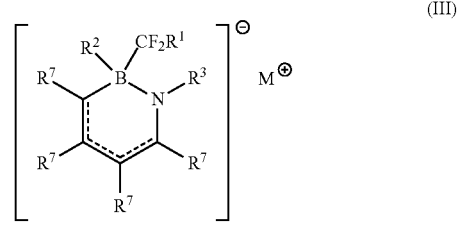

Y is F, Cl, Br, I, or a sulfonate; and
Ar is $C_{6-20}$aryl or $C_{1-15}$heteroaryl, and the heteroaryl comprises 1-5 ring heteroatoms selected from N, O, and S.

In embodiments, the electrophile can be $PdZ_2ArY$, wherein Z is any suitable ligand for palladium cross-coupling. In embodiments, Z can be a ligand comprising at least one P, N, O, or S coordinating atom. In embodiments, Z can comprise $PPh_3$. In embodiments, each Z can comprise the same ligand. In embodiments, each Z can comprise a different ligand. In embodiments, $Z_2$ can be a bis-chelating ligand comprising at least one P, N, O, or S chelating atom.

In some embodiments, the method of forming an aromatic difluorocarbon compound can further comprise an oxidant, a second Lewis acid, a fluoride ion source or a combination thereof. In embodiments, the oxidant can comprise a benzoquinone or a substituted benzoquinone, such as 2,3-dichloro-5,6-dicyano-1,4-benzoquinone. In embodiments, the fluoride ion source comprises $NMe_4F$. In embodiments, the second Lewis acid can comprise any suitable borane, such as $BF_3$ or $B(C_6F_5)_3$. In embodiments, the admixing is performed in the presence of a second Lewis acid to activate the electrophile. In embodiments, the second Lewis acid comprises $BF_3$ or $B(C_6F_5)_3$. In embodiments, the method of forming an aromatic difluorocarbon compound can further comprise any suitable reagent, such as, $NMe_4F$, to deprotect the electrophile, for example, a pyridine.

In various embodiments, the admixing can occur in any suitable solvent to couple the electrophile and $R^1CF_2$. In embodiments, the admixing can occur in a polar, aprotic solvent such as, dichloromethane, tetrahydrofuran, ethyl acetate, acetone, N,N-dimethylformamide, acetonitrile, dimethyl sulfoxide, N-methylpyrrolidone, propylene carbonate, hexamethylphosphoramide, and sulfolane. In embodiments, the admixing occurs in any suitable ether, such as tetrahydrofuran. In embodiments, the admixing occurs in tetrahydrofuran. In embodiments, the admixing can occur at any suitable temperature to couple the electrophile and $R^1CF_2$. In embodiments, the admixing can occur at a temperature of −110° C. to 70° C., such as −110° C., −100° C., −90° C., −80° C., −70° C., −60° C., −50° C., −40° C., −30° C., −20° C., −10° C., 0° C., 5° C., 10° C., 15° C., 20° C., 25° C., 30° C., 35° C., 40° C., 45° C., 50° C., 55° C., 60° C., 65° C., and 70° C. In embodiments, the temperature during the admixing can be at any temperature from −100° C. to 25° C. In embodiments, the temperature during the admixing is increasing, starting from about −80° C. and ending at about 25° C., wherein the temperature at any point during the admixing can be from −80° C. to 25° C. In embodiments, the temperature during admixing can be about 20° C. to about 25° C. In embodiments, the temperature during admixing can be about −80° C. In embodiments, the temperature during admixing can be about 50° C.

Azaborinine Compounds and Compositions

Provided herein are compounds of Formula (III):

$$\left[ \begin{array}{c} R^2 \diagdown \underset{B}{\overset{CF_2R^1}{|}} \diagup \\ R^7 \diagdown \phantom{B} \diagup N \diagdown R^3 \\ \phantom{R^7} \phantom{B} \phantom{N} \\ R^7 \diagup \phantom{B} \diagdown \phantom{N} \diagup R^7 \\ \phantom{R^7} R^7 \end{array} \right]^{\ominus} M^{\oplus} \qquad (III)$$

wherein:

the dashed lines indicate optional double bonds;

$R^1$ is H, $C_{6-20}$aryl, or $C_{1-15}$heteroaryl, and the heteroaryl comprises 1-5 ring heteroatoms selected from N, O, and S;

$R^2$ and $R^3$ are independently OH, $N(R^4)_2$, $C_{1-6}$alkyl, $C_{3-8}$cycloalkyl, $OC_{1-6}$alkyl, or $OC_{3-8}$cycloalkyl, or $R^2$ and $R^3$, taken together with the atoms to which they are attached, form an optionally substituted 5-7 membered ring;

each $R^4$ is independently $C_{1-6}$alkyl or $C_{3-8}$cycloalkyl;

each $R^7$ is independently H, $C_{1-6}$alkyl, $C_{3-8}$cycloalkyl, or at least one adjacent $R^7$ pair, taken together with the atoms to which they are attached, form an optionally substituted 5-7 membered ring; and M comprises a counterion.

The azaborinine compounds of Formula (III) disclosed above, can be selected from the group consisting of:

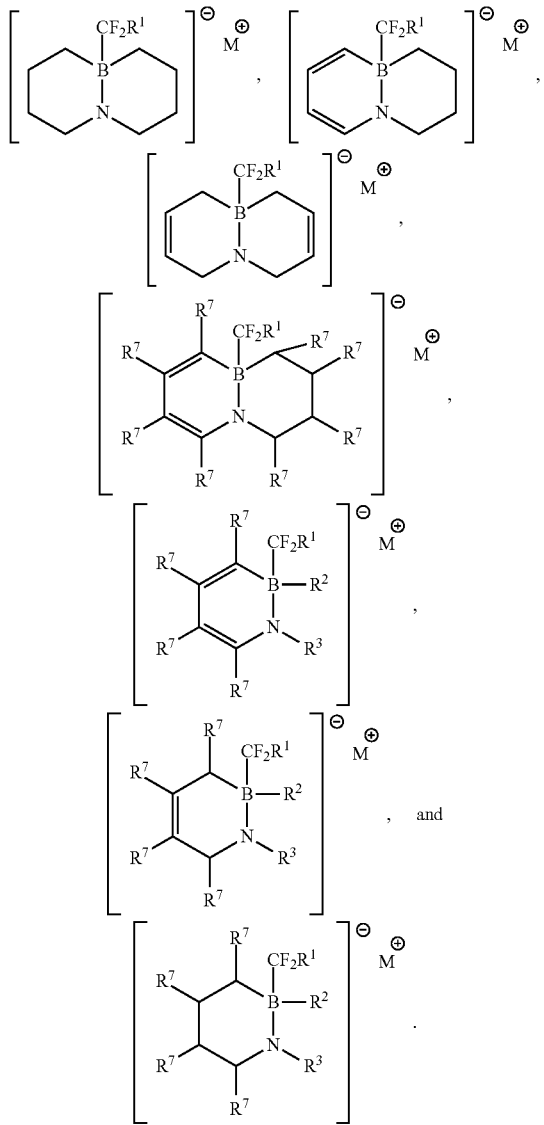

, and

The substituents $R^1$, $R^2$, and $R^3$ of the compounds of Formula (III) can be the same $R^1$, $R^2$, and $R^3$ of the borazine and/or borate compounds or compositions described above. In embodiments, at least one $R^2$ or $R^3$ is methyl. In embodiments, $R^2$ and $R^3$, taken together with the atoms to which they are attached, form an optionally substituted 5-7 membered ring. In embodiments, $R^1$ can be $C_{6-20}$aryl or $C_{1-15}$heteroaryl. In embodiments, $R^1$ can be H.

In embodiments, at least one $R^7$ is H. In embodiments, each $R^7$ is H. In embodiments, at least one $R^7$ is $C_{1-6}$alkyl, for example, $C_{1-4}$ alkyl (e.g., methyl, ethyl, n-propyl, isopropyl, n-butyl, isobutyl, sec-butyl, or tert-butyl), or $C_{5-6}$ alkyl (e.g., $C_5$ alkyl or $C_6$ alkyl). In various embodiments, each $R^7$ is $C_{1-6}$alkyl, for example, $C_{1-4}$ alkyl (e.g., methyl, ethyl, n-propyl, isopropyl, n-butyl, isobutyl, sec-butyl, or tert-butyl), or $C_{5-6}$ alkyl (e.g., $C_5$ alkyl or $C_6$ alkyl). In some embodiments, at least one of $R^7$ is methyl. In some embodiments, each $R^7$ is methyl. In some embodiments, at least one $R^7$ is $C_{3-8}$cycloalkyl (e.g., cyclopropyl, cyclobutyl, cyclopentyl, cyclohexyl, cycloheptyl, or cyclooctyl). In some embodiments, each $R^7$ is $C_{3-8}$cycloalkyl (e.g., cyclopropyl, cyclobutyl, cyclopentyl, cyclohexyl, cycloheptyl, or cyclooctyl). The cycloalkyl can be an isolated hydrocarbon ring or fused to a cycloalkyl group, a heterocycloalkyl group, an aryl group, a heteroaryl group, or a combination thereof. In embodiments, at least one adjacent $R^7$ pair, taken together with the atoms to which they attach, form an optionally substituted 5-7 membered ring. In some cases, two adjacent $R^7$ taken together with the atoms to which they are attached, form an optionally substituted 5-7 membered ring.

Another aspect of the disclosure herein, provides a composition comprising the compounds of Formula (III) and a crown ether. The crown ether described herein can be any suitable crown ether to one of skill in the art. In embodiments, the crown ether can be 18-crown-6, 15-crown-5, 12-crown-4, dibenzo-18-crown-6, diaza-18-crown-6, or a mixture thereof. In embodiments, the crown ether is 18-crown-6.

Methods of Preparing Azaborinine Compounds or Compositions

The disclosure herein provides a method for preparing the compounds or compositions described above, comprising contacting H—$CF_2R^1$ with a Lewis acid, a base, and optionally a crown ether under conditions sufficient to form the compound or composition, wherein the Lewis acid has a structure:

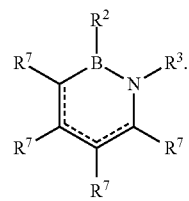

The substituents $R^1$ of the H—$CF_2R$, $R^2$, $R^3$, and $R^7$ of the Lewis acids above can be the same $R^1$, $R^2$, $R^3$, $R^7$ of the borazine, borate, or azaborinine compounds or compositions described herein. In embodiments, at least one of $R^2$ and $R^3$ of the Lewis acid is methyl. In embodiments, each of $R^2$ and $R^3$ of the Lewis acid is methyl. In embodiments, $R^1$ can be H, $C_{6-20}$aryl, or $C_{1-15}$heteroaryl. In embodiments, adjacent $R^2$ and $R^3$, taken together with the atoms to which they are attached, form an optionally substituted 5-7 membered ring. In embodiments, at least one $R^7$ can be H, $C_{1-6}$alkyl, or $C_{3-8}$cycloalkyl. In embodiments, at least one adjacent $R^7$ pair, taken together with the atoms to which they are attached, form an optionally substituted 5-7 membered ring.

The method herein can comprise any suitable base for the deprotonation of a $R^1CF_2$—H compound. In embodiments, the base can comprise an amide, a carbanion, or a mixture thereof. In embodiments, the base can comprise potassium bistrimethylsilylamide, potassium diisopropylamide, benzyl potassium, sodium bistrimethylsilylamide, sodium diisopropylamide, benzyl sodium, lithium diisopropylamide, lithium bistrimethylsilylamide, potassium diphenylmethanide, sodium diphenylmethanide, potassium diphenylmethylmethanide, sodium diphenylmethylmethanide, or a mixture thereof.

A combined experimental and theoretical approach was used to discover a Bronsted base/Lewis acid pair capable of $CF_2H_2$ deprotonation and $CF_2H^-$ capture. Important requirements for the base include a high degree of steric bulk, to ensure compatibility with a wide range of Lewis acids, sufficient basicity to deprotonate weakly acidic $CF_2H_2$, and a lack of fluorophilic $Li^+$ or $Na^+$ countercations. The $KCH_2Ph$ was selected as a bulky base with a higher experimental gas-phase proton affinity than $CF_2H^-$ (389 vs 382 kcal/mol) and a $CF_2H^-$— compatible countercation. The Lewis acid was hypothesized to appropriate $CF_2H^-$ affinity to afford sufficient stability to avoid $CF_2H^-$ dissociation and decomposition, while not forming such a strong $LA\text{-}CF_2H^-$ bond that $CF_2H^-$ transfer to electrophilic substrates is disfavored.

In various embodiments, the contacting or reacting occurs in a polar, aprotic solvent such as, dichloromethane, tetrahydrofuran, ethyl acetate, acetone, N,N-dimethylformamide, acetonitrile, dimethyl sulfoxide, N-methylpyrrolidone, propylene carbonate, hexamethylphosphoramide, and sulfolane. In embodiments, the contacting or reacting occurs in any suitable ether, such as tetrahydrofuran. In embodiments, the contacting or reacting occurs in tetrahydrofuran. In embodiments, the contacting and/or reacting is at a temperature of –110° C. to 50° C., such as –110° C., –100° C., –90° C., –80° C., –70° C., –60° C., –50° C., –40° C., –30° C., –20° C., –10° C., 0° C., 5° C., 10° C., 15° C., 20° C., 25° C., 30° C., 35° C., 40° C., 45° C., and 50° C. In embodiments, the contacting and/or reacting is at a temperature of –80° C. to 25° C. during the course of the contacting and/or reacting. In embodiments, the contacting and/or reacting is increasing in temperature, starting from –80° C. and ending at 25° C. during the course of the contacting and/or reacting, wherein the temperature at any point during the reaction can be –80° C. to 25° C.

Methods of Forming Difluorocarbon Compounds

Provided herein is a method of forming a difluorocarbon compound comprising admixing the compound of Formula (III) or the composition thereof described herein, with an electrophile under conditions sufficient to couple the electrophile and $R^1CF_2$ to form the difluorocarbon compound.

As used herein, the term "difluorocarbon compound" refers to a compound having a $R^1CF_2^-$ substituent, wherein $R^1$ is as defined herein. For example, an difluorocarbon compound can comprise $R^1CF_2$—SPh, $R^1CF_2$—C(OH)Ph$_2$, $R^1CF_2$—Py, any of the $R^1CF_2$—R compounds disclosed herein, or any other suitable substituents.

The electrophile of the method of forming a difluorocarbon compound can comprise any suitable electrophile to couple said electrophile and $R^1CF_2$. In embodiments, the electrophile can comprise an epoxide, an aziridine, an allene, an alkyl halide, an acyl halide, a carbene, a borane, a ketone, an aldehyde, a carboxylic acid, a pyridine, an aryl halide, an ester, a chalcone, an aryl isocyanate, a halogen, a sulfonyl, an imine, a disulfide, a nitroarene, a palladium cross-coupling reagent, a chromium aryl or heteroaryl reagent, an acyl chloride, sulfur dioxide, an elemental chalcogen (S, Se, or Te), carbon dioxide, dioxygen, or a mixture thereof. More specific contemplated electrophiles are as shown, e.g., in FIGS. 2, 3, and 4.

In some embodiments, the method of forming a difluorocarbon compound can further comprise an oxidant, a second Lewis acid, a fluoride ion source or a combination thereof. In embodiments, the oxidant can comprise a benzoquinone or a substituted benzoquinone, such as 2,3-dichloro-5,6-dicyano-1,4-benzoquinone. In embodiments, the fluoride ion source comprises $NMe_4F$. In embodiments, the second Lewis acid can comprise any suitable borane, such as $BF_3$ or $B(C_6F_5)_3$. In embodiments, the admixing is performed in the presence of a second Lewis acid to activate the electrophile. In embodiments, the second Lewis acid comprises $BF_3$ or $B(C_6F_5)_3$. In embodiments, the method of forming an aromatic difluorocarbon compound can further comprise any suitable reagent, such as, $NMe_4F$, to deprotect the electrophile, for example, a pyridine.

In various embodiments, the admixing can occur in any suitable solvent to couple the electrophile and $R^1CF_2$. In embodiment, the admixing can occur in a polar, aprotic solvent such as, dichloromethane, tetrahydrofuran, ethyl acetate, acetone, N,N-dimethylformamide, acetonitrile, dimethyl sulfoxide, N-methylpyrrolidone, propylene carbonate, hexamethylphosphoramide, and sulfolane. In embodiments, the admixing occurs in any suitable ether, such as tetrahydrofuran. In embodiments, the admixing occurs in tetrahydrofuran. In embodiments, the admixing can occur at any suitable temperature to couple the electrophile and $R^1CF_2$. In embodiments, the admixing can occur at a temperature of –110° C. to 70° C., such as –110° C., –100° C., –90° C., –80° C., –70° C., –60° C., –50° C., –40° C., –30° C., –20° C., –10° C., 0° C., 5° C., 10° C., 15° C., 20° C., 25° C., 30° C., 35° C., 40° C., 45° C., 50° C., 55° C., 60° C., 65° C., and 70° C. In embodiments, the temperature during the admixing can be at any temperature from –100° C. to 25° C. In embodiments, the temperature during the admixing is increasing, starting from about –80° C. and ending at about 25° C., wherein the temperature at any point during the admixing can be from –80° C. to 25° C. In embodiments, the temperature during admixing can be about 20° C. to about 25° C. In embodiments, the temperature during admixing can be about –80° C. In embodiments, the temperature during admixing can be about 50° C.

EXAMPLES

Materials and Methods

NMR spectra were recorded on a Varian Vnmrs 700, Varian Vnmrs 500, or Varian MR400 spectrometer. $^1H$, $^{13}C$, $^{19}F$, and $^{11}B$ shifts are reported in parts per million (ppm) relative to TMS, with the residual solvent peak used as an internal reference. $^{11}B$ and $^{19}F$ NMR spectra are referenced to fluorobenzene or, in spectra lacking internal standard, on a unified scale, where the single primary reference is the frequency of the residual solvent peak in the $^1H$ NMR spectrum. Peaks not listed in the peak assignment correspond to residual solvent. Multiplicities are reported as follows: singlet (s), doublet (d), triplet (t), quartet (q), pentet (p), septet (sp), and multiplet (m). Compounded splitting patterns are denoted through combinations of the above letters, e.g. dd for a doublet of doublets. Mass spectra were obtained on an electrospray Agilent Q-TOF mass spectrometer or a Micromass AutoSpec Ultima Magnetic Sector Mass Spectrometer electron ionization mass spectrometer. NMR spectra were processed using MestReNova version 10.0.2. For the purpose of labeling atoms for spectral assignments, some hydrogen atoms are labeled with greek letters while carbon atoms are labeled with numbers. In spectra of in-situ reactions, fluorobenzene (internal standard) appears at –113.15 ppm. Water and H-grease also appear as trace contaminants in the $^1$H-NMR spectra of isolated organic compounds (1.56 and 0.85/1.25 ppm, respectively).

Computational Details

Calculations were performed with the Gaussian 09 suite of programs using the M062 X functional (Zhao, et. al., *Theor. Chem. Acc.*, 2008, 120, 215-241), the IEFPCM polarizable continuum solvent model for dimethylsulfoxide (Scalmani, et. al., *The Journal of Chemical Physics*, 2010, 132, 114110), and an ultrafine (150,974 point) integration grid for all atoms. All reported compounds underwent geometry optimization with the 6-31 G(d,p) basis set (Rassolov, et. al., *J. Comput. Chem.*, 2001, 22, 976-984) followed by vibrational frequency calculations. These were used to verify that the structures were truly local energetic minima by the absence of imaginary vibrational modes and to provide entropies of formation at 25° C. Newly reported optimized geometries appear at the end of the Supporting Information.

Syntheses

Synthesis of Compounds and Compositions of Formula (I)

Synthesis of [K(18-crown-6)][$B_3N_3Me_6$($CF_2Ph$)]

Procedure (A)-Addition of PhCF$_2$H to an equimolar combination of B$_3$N$_3$Me$_6$, KCH$_2$Ph, and 18-crown-6 in THF at 25° C. afforded the composition [K(18-crown-6)][PhCF$_2$—B$_3$N$_3$Me$_6$] in 99% chemical yield and 72% isolated yield (>9 g scale) as a crystalline solid (FIG. 1, 1). Similar reactions carried out using KC(Me)Ph$_2$ (2%) and KCHPh$_2$ (0%) provided a significantly lower yield, and allowed the pKa of PhCF$_2$H to be bracketed between 41 (PhCH$_3$) and 35 (Ph$_2$CHMe). The use of bulkier Li, Na and K diisopropylamide bases was investigated and found that KN(iPr)$_2$ afforded the product in high yield (90%), while NaN(iPr)$_2$ (21%) and LiN(iPr)$_2$ afforded lower yields of CF$_2$Ph$^-$ containing product, consistent with α-defluorination by these more Lewis acidic countercations. α-Defluorination is not promoted by less Lewis acidic B$_3$N$_3$Me$_6$ or K(18-crown-6)$^+$.

Procedure (B)-To a solution of [K(18-crown-6)][B$_3$N$_3$Me$_6$(CH$_2$Ph)](2.0 mmol, 10 mL 0.20 M stock in THF) at 0° C. was added PhCF$_2$H (247 µL, 2.2 mmol), and the reaction mixture stirred for 15 minutes at room temperature. PhF (0.4 mmol) was added as an internal standard, and the mixture analyzed by NMR spectroscopy. A single crystal was obtained by slow diffusion of pentane into the THF solution at −30° C. To obtain a solid, the solution was poured into 100 mL pentane and stirred at room temperature for 15 minutes. The suspension was filtered and washed with pentane to provide the title compound as a white solid in quantitative yield.

A wide variety of R$^1$CF$_2$—H compounds reacted with KN(iPr)$_2$/B$_3$N$_3$Me$_6$/18-crown-6 in THF at −80° C. to form stabilized R$^1$CF$_2$$^-$ synthons, illustrated in FIG. 3, 3a-3k. The reagents were prepared at −80° C. and characterized at −80° C. using $^{11}$B and $^{19}$F NMR spectroscopy. The selectivity of R$^1$CF$_2$H deprotonation in the presence of aryl bromides was studied. Aryl bromide substrates are susceptible to o-metalation/benzyne formation, and are also not tolerated by electrochemical and photoredox methods. 2-(3a in FIG. 3, 67%), 3-(3b in FIG. 3, 93%), and 4-(3c in FIG. 3, 99%) bromine substituted benzenes can be transformed into compounds or compositions of Formula (I) described above in high yield. Difluoromethyl heteroarenes can be similarly deprotonated to reveal R$^1$CF$_2$· synthons. In addition to the deprotonation of resonance-activated 2- and 4-difluoromethylpyridine (FIG. 3, 3d, 83%, 3f, 98% chemical yield), 3-difluoromethylpyridine and 7-difluoromethylquinoline can also be deprotonated in high yield (3e, 3h in FIG. 3; 91%, 94% respectively). Beyond six-membered N-heterocycles, difluoromethylated five-membered heterocycles also supported R$^1$CF$_2$H deprotonation. 2-Difluoromethyl benzofuran (3i in FIG. 3, 67%), N-benzyl 2-difluoromethyl benzimidazole (3g in FIG. 3, 94%), 1-difluoromethyl-4-(1-methyl-4-pyrazolyl)benzene (3k in FIG. 3, 95%), and 2-difluoromethyl-5-(tert-butylacetylenyl)-thiophene (3j in FIG. 3, 95%) were all deprotonated in high yield.

Synthesis of [K(18-crown-6)][$B_3N_3Me_6$($CF_2R^1$)]

General Protocol: Potassium diisopropylamide ("KDA") (41.8 mg, 0.30 mmol) was dissolved in 5 mL THF at −80° C. and allowed to stand for one minute. [Important: KDA is unstable in THF at room temperature, so must be weighed into an empty vessel, the vessel and solid KDA precooled to −80° C., and dissolved in THF precooled to −80° C.]Separately, hexamethylborazine (54.12 mg, 0.33 mmol), 18-crown-6 (79.2 mg, 0.30 mmol), and R$^1$CF$_2$H (0.33 mmol) were dissolved in 10 mL THF and the solution cooled to −80° C. The solution of KDA was then rapidly added to the solution of hexamethylborazine, 18-crown-6, and R$^1$CF$_2$H, and the mixture allowed to stand for five minutes. 0.060 mmol PhF was then added as an internal standard, and the solutions were analyzed by NMR spectroscopy at −80° C. [Important: the concentration of generated reagent should not exceed 20 mM during synthesis, or reduced yields are observed in many cases.]

(2-Bromophenyl)difluoromethanide hexamethylborazine adduct: 0.3 mmol scale. Yield ($^{19}$F NMR): 67%. $^{11}$B NMR: −5.27. $^{19}$F NMR: −105.48.

(3-Bromophenyl) difluoromethanide hexamethylborazine adduct: 0.3 mmol scale. Yield ($^{19}$F NMR): 93%. $^{11}$B NMR: −5.46. $^{19}$F NMR: −110.23.

(4-Bromophenyl) difluoromethanide hexamethylborazine adduct: 0.3 mmol scale. Yield ($^{19}$F NMR): 99%. $^{11}$B NMR: −5.47, 34.90. $^{19}$F NMR: −110.57.

(2-Pyridyl) difluoromethanide hexamethylborazine adduct: 0.3 mmol scale. Yield ($^{19}$F NMR): 83%. $^{11}$B NMR: −4.32. $^{19}$F NMR: −112.02.

(3-Pyridyl) difluoromethanide hexamethylborazine adduct: 0.3 mmol scale. Yield ($^{19}$F NMR): 91%. $^{11}$B NMR: −4.41, 35.95. $^{19}$F NMR: −110.05.

(4-Pyridyl) difluoromethanide hexamethylborazine adduct: 0.3 mmol scale. Yield ($^{19}$F NMR): 98%. $^{11}$B NMR: −4.33. $^{19}$F NMR: −111.55.

(1-Benzyl-1H-benzo[d]imidazol-2-yl) difluoromethanide hexamethylborazine adduct: 0.3 mmol scale. Yield ($^{19}$F NMR): 94%. $^{11}$B NMR: −4.20, 35.33. $^{19}$F NMR: −106.83.

(4-(1-methyl-1H-pyrazol-5-yl) difluoromethanide hexamethylborazine adduct: 0.3 mmol scale. Yield ($^{19}$F NMR): 95%. $^{11}$B NMR: −4.43. $^{19}$F NMR: −108.89.

Synthesis of Aromatic Difluorocarbon Compounds

The compounds or compositions described herein were shown to readily transfer R$^1$CF$_2$· equivalents to electrophiles. Compound 1 was shown to: (1) difluorobenzylate a variety of simple carbonyl and imine containing electrophiles in moderate to high yield, such as in FIG. 2 in (a), 2a-2d, 52-84%; (2) transfer PhCF$_2$ to enolizable carbonyl compounds in modest to good yield, such as in FIG. 2 in (a), 2e-2f, 47% to 62%; (3) tolerate tertiary amines, tosyl groups, esters, and aromatic halides, such as exemplified by the difluorobenzylation of haloperidol benzoyl ester (FIG. 2 in (a), 2f), a derivatized antipsychotic; (4) react with sulfur dioxide that underwent 1,2-addition to afford potassium difluorobenzylsulfinate, such as in FIG. 2 in (a), 2i, 48%; and (5) react with diphenyldisulfide (Ph$_2$S$_2$) and bromine (Br$_2$), seen in FIG. 2 in (a), 2h, 78%; 2 g, 85%. Without being intended to be bound by theory, the reaction of compounds or compositions of Formula (I) with sulfur dioxide is thought the be an oxidatively activated R¹CF₂. proradical capable of facilitating addition to α/β unsaturated tosyl amides.

Figure 2:
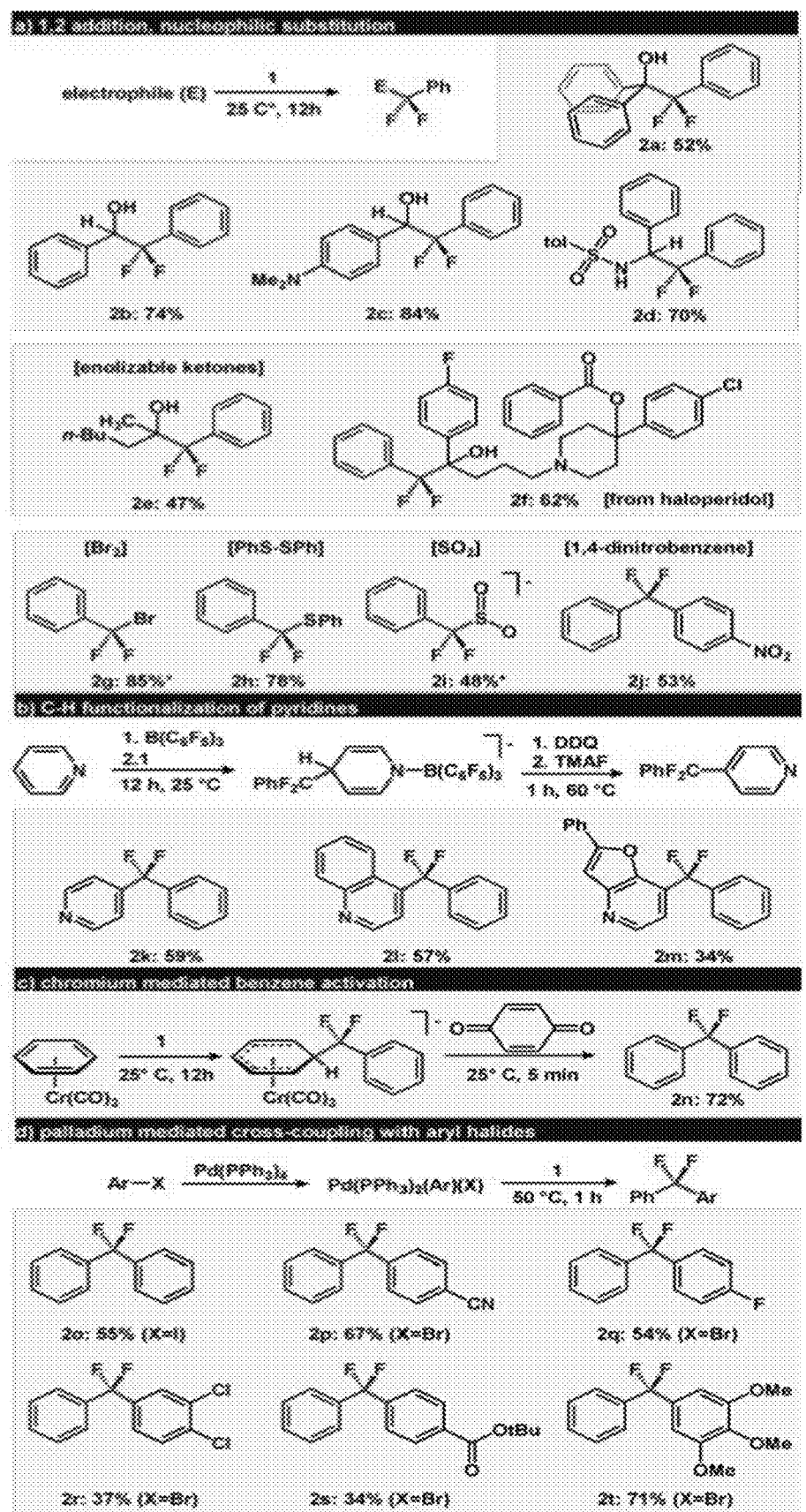
FIG. 2 shows reactions with 1, which has a structure of [PhCF$_2$—B$_3$N$_3$Me$_6$] as shown in FIG. 1, in (a) reactions with ketones, aldehydes, imines, disulfides, Br$_2$, SO$_2$, and 1,4-dinitrobenzene; in (b) two-phase C—H difluorobenzylation of pyridines; in (c) chromium(0)(CO)$_3$ mediated benzene C—H difluorobenzylation; and in (d) palladium-mediated difluorobenzylation.
Figure 3:
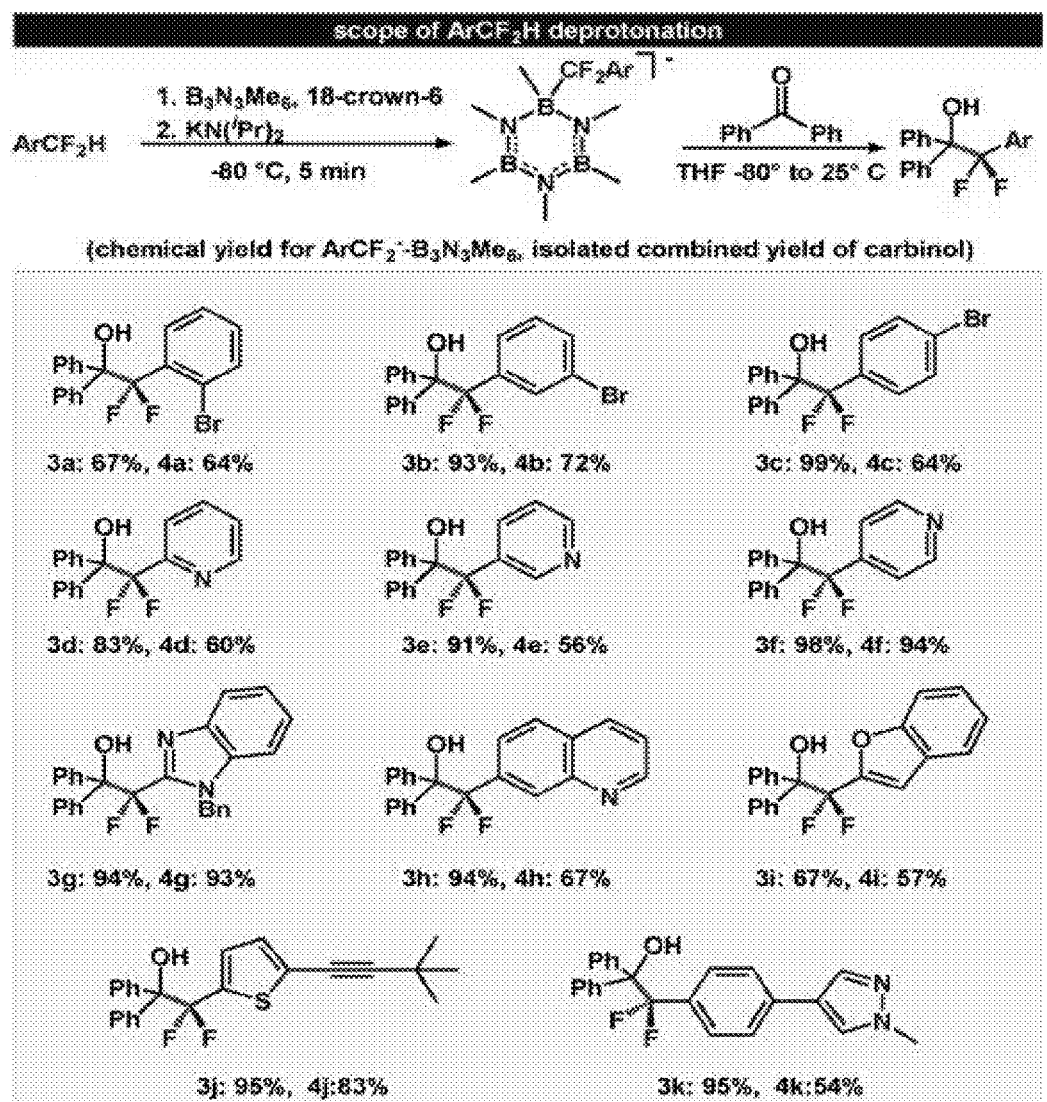
FIG. 3 shows the scope of R$^1$CF$_2$H deprotonation, R$^1$CF$_2^-$ stabilization by B$_3$N$_3$Me$_6$, and transfer of R$^1$CF$_2^-$ equivalents with benzophenone (PhC(O)Ph).

Compound 1 was shown to directly difluorobenzylate dinitrobenzene in moderate yield (FIG. 2 in (a), 2j, 53%). Without intending to be bound by theory, it is thought the direct difluorobenzylation of dinitrobenzene by a compound or composition of Formula (I) is accomplished via a net nucleophilic aromatic substitution ($S_NAr$) reaction. When activated with a bulky and strong Lewis acid, $B(C_6F_5)_3$, pyridines also react with compounds and compositions of Formula (I). For example, 1 was shown to selectively generate a LA-stabilized anionic σ-adduct, that can be oxidized with 2,3-dichloro-5,6-dicyano-1,4-benzoquinone ("DDQ") and was deprotected with $NMe_4F$ to generate the aromatic 4-difluorobenzylated pyridine. The reaction of compounds or compositions of Formula (I) and a pyridine can be, and in some cases was conducted in one pot with a single solvent, affording the final product in good combined yield through four telescoped steps, such as shown in FIG. 2 in (b), 2k-2m, 34-57%. An alternative activation strategy for non-heterocyclic arenes, such as benzene, is to use chromium(0) tricarbonyl. 1 was shown to react with said chromium reagent and benzene to afford a stable σ-adduct that was oxidized with benzoquinone to afford diphenyl difluoromethane (FIG. 2 in (c), 2n, 72%).

In addition to direct difluorobenzylation of activated arenes, the ability of the compounds and compositions of Formula (I) to access R¹CF₂—Ar species from widely available aryl bromides and iodides through palladium-mediated cross coupling was assessed. For example, $Pd(PPh_3)_4$ as a readily available stoichiometric reagent was used to mediate a variety of Ar—Br and Ar—I cross-coupling reactions with 1, as a transmetalation reagent. 1 was allowed to react with in-situ generated $Pd(PPh_3)_2(Ar)X$ species, affording Ph-CF₂—Ar products in moderate to high yield (FIG. 2 in (d), 2o-2t, 34-71%). Various compounds or compositions of Formula (I) can efficiently transfer R¹CF₂, to an electrophile, such as, $Ph_2CO$, affording the 1,2-addition products in moderate to high combined yield forming an aromatic difluorocarbon compound (FIG. 3, 4a-4j).

Figure 4:
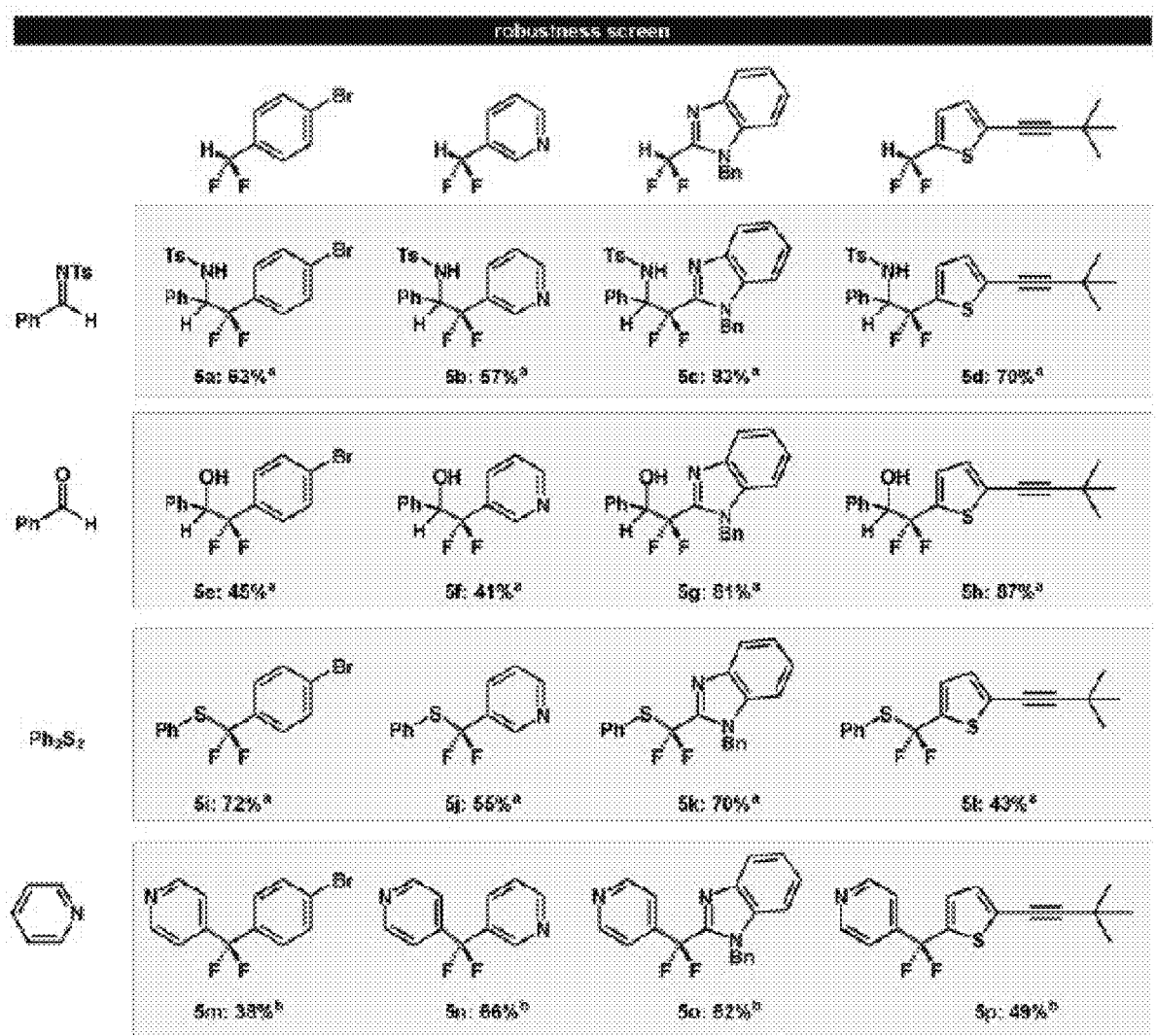
FIG. 4 shows conjugative coupling of electrophiles and R$^1$CF$_2$H pronucleophiles where reaction steps are (a)$_{12}$ hours, 25° C. or (b) (step 1) Pyridine and B(C$_6$F$_5$)$_3$, 5 min, −80° C.; R$^1$CF$_2$H, B$_3$N$_3$Me$_6$, 18-crown-6, and KN(iPr)$_2$, 10 min, −80° C., (step 2) Pyridine-B(C$_6$F$_5$)$_3$ and R$^1$CF$_2$—B$_3$N$_3$Me$_6^-$, 12 hours, 25° C.; (step 3) DDQ, 15 min, 25° C.; (step 4) NMe$_4$F, 1 hour, 60° C. (combined yield through four steps).

The robustness of this methodology was shown by combining a pool of four structurally distinct compounds or compositions of Formula (I) with a pool of four representative electrophiles (imine, aldehyde, disulfide, and LA-activated pyridine) to generate sixteen unique products (FIG. 4). In all cases, the reactions proceeded to a single product with moderate to high isolated yield (FIG. 4, 5a-5p, 41-83%). The reactions tolerate a wide variety of functional groups, and provide rapid access to structural diversity from simple precursors.

Screening of Aromatic Difluorocarbon Compounds

General protocol: 0.05 mmol R¹CF₂⁻ reagent in 1.0 mL THF was combined with 0.05 mmol electrophile dissolved in 0.5 mL THF at −80° C. Reaction progress was measured after 10 minutes at room temperature by ¹⁹F-NMR spectroscopy, measuring the quantity of aromatic difluorocarbon product generated. As used herein, the term "R¹CF₂⁻ reagent" is a compound or composition of Formula (I) described herein.

| Electrophile | HF₂C—Ph | HF₂C—C₆H₄—Br | HF₂C—Py | HF₂C—benzimidazole(Bn) | HF₂C—thiophene—C≡C—tBu |
|---|---|---|---|---|---|
| Ph-CHO | 60% | 62% | 91% | 72% | 86% |
| Ph-C(O)-CH₃ | 11% | 44% | 7% | 30% | 46% |
| Ph-C(O)-Ph | 45% | 59% | 75% | 100% | 61% |
| Ph-C(O)-Cl | 53% | 77% | 12% | 31% | 16% |
| Ph-C(O)-OMe | 23% | 50% | 60% | 90% | 90% |
| Ph-CH=CH-C(O)-Ph | 30% | 77% | 62% | 68% | 60% |
| Ph-CH=CH-CHO | — | 0% | 0% | — | — |

| | HF₂C-Ph | HF₂C-C₆H₄-Br | HF₂C-pyridyl | HF₂C-benzimidazole(Bn) | HF₂C-thiophene-t-Bu-alkyne |
|---|---|---|---|---|---|
| Phenyl acrylate | — | 0% | 0% | — | — |
| PhCH=N-Ts | 42% | 82% | 92% | 82% | 90% |
| 1,4-dinitrobenzene | 38% | 27% | 34% | 16% | 24% |
| 2-nitropyridine | 8% | 18% | 20% | 36% | 14% |
| 5-bromo-2-chloropyrimidine | 56% | 72% | 76% | 86% | 85% |
| 2,4-dichloroquinazoline | 0% | — | — | — | — |
| PhS-SPh | 43% | 88% | 98% | 73% | 98% |
| Ph-N=C=O | 24% | 32% | 39% | 63% | 66% |

Reactions with Ph₂CO

General protocol: The 0.020 M, THF solution obtained from a 0.30 mmol scale preparation of R¹CF₂⁻ reagent was combined with Ph₂CO (i.e., substrate) (54.6 mg, 0.30 mmol) dissolved in 3.0 mL THF at −80° C. The reaction mixture was then allowed to warm to room temperature and allowed to stand for 10 minutes. The solution was poured into saturated NH₄Cl in H₂O (50 mL) and the organics extracted into DCM (3×50 mL). The organic extract was dried with MgSO₄, filtered, concentrated onto 3 grams of silica gel, and purified by flash chromatography as specified.

(2-(3-pyridyl)-2,2-difluoro-1-phenylethanol)

0.30 mmol substrate, 1 equiv. R¹CF₂⁻ reagent. Chromatography conditions: 10% to 60% ethyl acetate/hexanes over 12 column volumes, 50 g SiO₂, flow rate 0.5 column volumes per minute. 55.9 mg white solid, 60%. ¹H-NMR (CDCl₃): 8.43 (1H, (d, $J_{1H-1H}$=4.6)), 7.80 (1H, (t, $J_{1H-1H}$=7.8)), 7.75 (1H, (d, $J_{1H-1H}$=7.8)), 7.57 (4H, (d, $J_{1H-1H}$=7.8)), 7.30 (α, 1H, (dd, $J_{1H-1H}$=7.5, 5.0)), 7.26 (4H, (t, $J_{1H-1H}$=7.7)), 7.24 (1H, s), 7.22 (ζ, 2H, (t, $J_{1H-1H}$=7.0)). ¹³C-NMR: 155.03 (t, $J_{13C-19F}$=29.7), 147.87, 141.49, 137.87, 127.90 (t, $J_{13C-19F}$=2.3), 127.67, 127.47, 124.90, 121.32 (t, $J_{13C-19F}$=4.2), 116.97 (t, $J_{13C-19F}$=252.6), 81.32 (t, $J_{13C-19F}$=24.3). ¹⁹F-NMR: −104.19 (2F, s). HRMS (ESI+): 294.1092 (M-OH: 294.1094).

(2-(3-pyridyl)-2,2-difluoro-1-phenylethanol)

0.30 mmol substrate, 1 equiv. R¹CF₂⁻ reagent. Chromatography conditions: 10% to 60% ethyl acetate/hexanes over 12 column volumes, 50 g SiO₂, flow rate 0.5 column volumes per minute. 52.3 mg white solid, 56%. ¹H-NMR (CDCl₃): 8.46 (α, 1H, (d, $J_{1H-1H}$=4.5)), 8.29 (1H, s), 7.43 (4H, (d, $J_{1H-1H}$=6.0)), 7.29 (1H, overlap), 7.28 (4H, (t, $J_{1H-1H}$=6.0)), 7.26 (2H, (t, $J_{1H-1H}$=6.6)), 7.09 (1H, (dd, $J_{1H-1H}$=8.4, 4.9)), 3.46 (1H, s). ¹³C-NMR: 150.30, 148.36 (t, $J_{13C-19F}$=6.7), 141.15, 135.03 (t, $J_{13C-19F}$=6.3), 130.41 (t, $J_{13C-19F}$=26.8), 128.05, 127.98 (t, $J_{13C-19F}$=2.2), 127.90, 122.54 (t, $J_{13C-19F}$=256.5), 121.82, 80.60 (t, $J_{13C-19F}$=28.0). ¹⁹F-NMR: −102.72 (2F, s). HRMS (ESI+): 312.1198 (M+H: 312.1200).

(2-(3-pyridyl)-2,2-difluoro-1-phenylethanol)

0.30 mmol substrate, 1 equiv. R¹CF₂⁻ reagent. Chromatography conditions: 20% to 100% ethyl acetate/hexanes over 12 column volumes, 50 g SiO2, flow rate 0.5 column volumes per minute. 87.7 mg white solid, 94%. ¹H-NMR (CDCl$_3$): 8.38 (2H, (d, J$_{1H-1H}$=5.4)), 7.43 (4H, (d, J$_{1H-1H}$=7.0)), 7.27 (4H, overlap), 7.26 (2H, overlap), 6.96 (2H, (d, J$_{1H-1H}$=5.5)), 3.81 (1H, s). $^{13}$C-NMR: 148.60, 142.84 (t, J$_{13C-19F}$=27.6), 141.08, 128.04, 127.95 (t, J$_{13C-19F}$=2.2), 127.90, 122.14 (t, J$_{13C-19F}$=256.5), 121.96 (t, J$_{13C-19F}$=6.1), 80.42 (t, J$_{13C-19F}$=27.3). $^{19}$F-NMR: −101.3 (2F, s). HRMS (ESI+): 312.1197 (M+H: 312.1200).

(2-(4-bromophenyl)-2,2-difluoro-1-phenylethanol)

0.30 mmol substrate, 1 equiv. R$^1$CF$_2^-$ reagent. Chromatography conditions: 1% to 20% ethyl acetate/hexanes over 10 column volumes, 50 g SiO$_2$, flow rate 0.5 column volumes per minute. 52.5 mg colorless oil, 45%. $^1$H-NMR (CDCl$_3$): 7.61 (4H, (d, J$_{1H-1H}$=7.8), 7.55 (1H, (d, J$_{1H-1H}$=7.5)), 7.51 (1H, (t, J$_{1H-1H}$=7.8)), 7.37 (4H, (t, J$_{1H-1H}$=7.4)), 7.34 (2H, (t, J$_{1H-1H}$=7.2)), 7.16 (1H, (d, J$_{1H-1H}$=8.1)), 7.10 (1H, (t, J$_{1H-1H}$=7.5)), 1.30 (1H, s). $^{13}$C-NMR: 159.47 (t, J$_{13C-19F}$ 8.0), 137.60 (t, J$_{13C-19F}$=2.0), 133.68 (t, J$_{13C-19F}$=1.8), 128.25, 128.04, 127.16 (t, J$_{13C-19F}$=1.6), 126.01 (t, J$_{13C-19F}$=254.4), 124.27, 122.16 (t, J$_{13C-19F}$=1.8), 121.61 (t, J$_{13C-19F}$=26.4), 111.66, 93.06 (t, J$_{13C-19F}$=24.4). $^{19}$F-NMR: −89.66 (2F, s). HRMS (ES+): 308.1026 (M−HBr: 308.1013).

(2-(4-bromophenyl)-2,2-difluoro-1-phenylethanol)

0.30 mmol substrate, 1 equiv. R$^1$CF$_2^-$ reagent. Chromatography conditions: 0% to 10% ethyl acetate/hexanes over 12 column volumes, 50 g SiO$_2$, flow rate 0.5 column volumes per minute. 84.0 mg colorless oil, 72%. $^1$H-NMR (CDCl$_3$): 7.46 (1H, (d, J$_{1H-1H}$=7.1)), 7.45 (4H, (d, J$_{1H-1H}$=11.2)), 7.30 (4H, overlap), 7.29 (2H, m), 7.24 (1H, s), 7.06 (1H, (t, J$_{1H-1H}$=7.9)), 6.97 (1H, (d, J$_{1H-1H}$=7.8)), 2.81 (1H, s). $^{13}$C-NMR: 141.20, 136.38 (t, J$_{13C-19F}$=26.8), 132.62, 130.75 (t, J$_{13C-19F}$=6.7), 128.01, 128.00, 127.86, 126.08 (t, J$_{13C-19F}$=6.5), 122.51 (t, J$_{13C-19F}$=256.9), 121.13, 80.83 (t, J$_{13C-19F}$=28.4). $^{19}$F-NMR: −101.79 (2F, s). HRMS (ESI+): 183.0806, 204.9470 (M−OH: 294.9934). (M−BrPhCF$_2$: 183.0810; M−Ph$_2$CO: 204.9464).

(2-(4-bromophenyl)-2,2-difluoro-1-phenylethanol)

0.30 mmol substrate, 1 equiv. R$^1$CF$_2^-$ reagent. Chromatography conditions: 0% to 18% ethyl acetate/hexanes over 12 column volumes, 50 g SiO$_2$, flow rate 0.5 column volumes per minute. 74.7 mg white solid, 64%. $^1$H-NMR (CDCl$_3$): 7.44 (6H, (d, J$_{1H-1H}$=6.7)), 7.34 (2H, (d, J$_{1H-1H}$=8.4)), 7.28 (4H, overlap), 7.27 (2H, overlap), 6.94 (2H, (d, J$_{1H-1H}$=8.3)), 2.78 (1H, s)). $^{13}$C-NMR: 141.28, 133.41 (t, J$_{13C-19F}$=26.7), 130.25, 129.13 (t, J$_{13C-19F}$=6.5), 127.97, 127.94, 127.86, 124.19 (t, J$_{13C-19F}$=1.9), 122.99 (t, J$_{13C-19F}$=256.5), 80.77 (t, J$_{13C-19F}$=28.6). $^{19}$F-NMR: −101.67 (2F, s) HRMS (ESI+): 183.0617, 204.9467 (M−BrPhCF$_2$: 183.0810; M−Ph$_2$CO: 204.9464).

(2-(3-pyridyl)-2,2-difluoro-1-phenylethanol)

0.30 mmol substrate, 1 equiv. R$^1$CF$_2^-$ reagent. Chromatography conditions: 0% to 100% ethyl acetate/hexanes over 15 column volumes, 50 g SiO$_2$, flow rate 0.5 column volumes per minute.

A fraction eluting at 8 CV was further purified by reverse phase chromatography: 0-100% MeCN/H$_2$O over 20 CV, 25 g Biotage SNAP Ultra C18, 1 CV/min. 63.2 mg white solid, 54%. $^1$H-NMR (CDCl$_3$): 7.47 (4H, overlap), 7.47 (1H, overlap), 7.28 (4H, overlap), 7.27 (2H, overlap), 7.24 (2H, (d, J$_{1H-1H}$=8.0)), 7.15 (2H, (d, J$_{1H-1H}$=8.0)), 6.29 (1H, (d, J$_{1H-1H}$=4.0)), 3.82 (3H, s), 3.32 (1H, s). $^{13}$C-NMR: 142.78, 141.50, 138.52, 134.58 (t, J$_{13C-19F}$=26.5), 131.75, 128.05 (t, J$_{13C-19F}$=2.1), 127.87, 127.81 (t, J$_{13C-19F}$=6.4), 127.78, 127.25, 123.12 (t, J$_{13C-19F}$=256.4), 106.22, 80.86 (t, J$_{13C-19F}$=28.6), 37.46. $^{19}$F-NMR: −101.57 (2F, s). HRMS (ESI+): 391.1619 (M+H: 391.1622).

(2-(1-benzyl-1H-benzo[d]imidazol-2-yl)-2,2-difluoro-1-phenylethanol)

0.30 mmol substrate, 1 equiv. R$^1$CF$_2$, reagent. Chromatography conditions: 1% to 20% ethyl acetate/hexanes over 10 column volumes, 100 g SiO$_2$, flow rate 0.25 column volumes per minute. 122.9 mg white solid, 93%. $^1$H-NMR (CDCl$_3$): 7.70 (1H, (dd, J$_{1H-1H}$=7.0, 2.3)), 7.53 (4H, (d, J$_{1H-1H}$=7.3)), 7.34 (2H, overlap), 7.32 (1H, overlap), 7.31 (1H, overlap), 7.30 (1H, overlap), 7.27 (1H, overlap), 7.26 (2H, overlap), 7.25 (4H, overlap), 7.14 (1H, s), 7.10 (2H, (d, J$_{1H-1H}$=7.3)), 5.64 (2H, s). $^{13}$C-NMR: 146.14 (t, J$_{13C-19F}$=30.8), 141.39, 140.46, 135.72, 134.94, 128.88, 127.93, 127.91, 127.90, 127.72, 127.62, 126.22, 124.90, 123.44, 120.94, 117.14 (t, J$_{13C-19F}$=249.9), 110.86, 81.19 (t, J$_{13C-19F}$=23.3), 48.55 (t, J$_{13C-19F}$=4.2). $^{19}$F-NMR: 96.11 (2F, s, broad). HRMS (ESI+): 441.1776 (M+H: 441.1778).

(2-(1-benzyl-1H-benzo[d]imidazol-2-yl)-2,2-difluoro-1-phenylethanol): 0.30 mmol substrate, 1 equiv. R$^1$CF$_2^-$ reagent. Chromatography conditions: 1% to 20% ethyl acetate/hexanes over 10 column volumes, 100 g SiO$_2$, flow rate 0.25 column volumes per minute. 122.9 mg white solid, 93%. $^1$H-NMR (CDCl$_3$): 7.70 (1H, (dd, J$_{1H-1H}$=7.0, 2.3)), 7.53 (4H, (d, J$_{1H-1H}$=7.3)), 7.34 (2H, overlap), 7.32 (1H, overlap), 7.31 (1H, overlap), 7.30 (1H, overlap), 7.27 (1H, overlap), 7.26 (2H, overlap), 7.25 (4H, overlap), 7.14 (1H, s), 7.10 (2H, (d, J$_{1H-1H}$=7.3)), 5.64 (2H, s). $^{13}$C-NMR: 146.14 (t, J$_{13C-19F}$=30.8), 141.39, 140.46, 135.72, 134.94, 128.88, 127.93, 127.91, 127.90, 127.72, 127.62, 126.22, 124.90, 123.44, 120.94, 117.14 (t, J$_{13C-19F}$=249.9), 110.86, 81.19 (t, J$_{13C-19F}$=23.3), 48.55 (t, J$_{13C-19F}$=4.2). $^{19}$F-NMR: 96.11 (2F, s, broad). HRMS (ESI+): 441.1776 (M+H: 441.1778).

Robustness Screen

Protocol A: The ~0.020 M, THF solution obtained from a 0.30 mmol scale preparation of R$^1$CF$_2^-$ reagent was combined with an electrophile (i.e., substrate) (0.30 mmol) dissolved in 3.0 mL THF at −80° C. The reaction mixture was then allowed to warm to room temperature and allowed to stand for 10 minutes. The solution was poured into saturated NH$_4$Cl in H$_2$O (50 mL) and the organics extracted into DCM (3×50 mL). The organic extract was dried with MgSO$_4$, filtered, concentrated onto 3 grams of silica gel, and purified by flash chromatography as specified.

Protocol B: The ~0.020 M, THF solution obtained from a 0.30 mmol scale preparation of R$^1$CF$_2^-$ reagent was combined with pyridine-B(C$_6$F$_5$)$_3$ (0.30 mmol) dissolved in 3.0 mL THF at −80° C. The reaction was allowed to stand for 2 hours at room temperature. DDQ (68.1 mg, 0.30 mmol) was then added, and the reaction mixture stirred for ten minutes. Tetramethylammonium fluoride (41.9 mg, 0.45 mmol) was then added, and the reaction mixture stirred for 1 hour at 60° C. The reaction mixture was then poured into saturated NaHCO$_3$ in H$_2$O (50 mL) and the organics extracted into DCM (3×50 mL). The organic extract was dried with MgSO$_4$, filtered, concentrated onto 3 grams of silica gel, and purified by flash chromatography as specified.

(4-Bromophenyl)difluoromethyl phenyl sulfide:

Protocol A used. Substrate: Diphenyl disulfide. 0.30 mmol substrate, 1 equiv. R$^1$CF$_2^-$ reagent. Chromatography conditions: 100% Hexane, 8 column volumes, 100 g SiO$_2$, flow rate 0.25 column volume per minute, repeated 5 times to remove Ph$_2$S$_2$. 68.4 mg white solid, 72%. $^1$H-NMR (CDCl$_3$): 7.61 (2H, (d, J$_{1H-1H}$=7.2)), 7.55 (2H, (d, J$_{1H-1H}$=8.5)), 7.44 (1H, (t, J$_{1H-1H}$=7.4)), 7.43 (2H, (d, J$_{1H-1H}$=8.3)), 7.38 (2H, (t, J$_{1H-1H}$=7.5)). $^{13}$C-NMR: 136.41, 134.96 (t, J$_{13C-19F}$=25.6), 131.58, 130.08, 128.08, 127.23 (t, J$_{13C-19F}$=278.8), 127.12 (t, J$_{13C-19F}$=4.5), 127.02, 125.10. $^{19}$F-NMR: −72.03 (s). HRMS (ES+): 313.9576 (M: 313.9576).

(3-Pyridyl)difluoromethyl phenyl sulfide:

Protocol A used. Substrate: Diphenyl disulfide. 0.30 mmol substrate, 1 equiv. R$^1$CF$_2^-$ reagent. Chromatography conditions: 12% to 100% ethyl acetate/hexanes over 12 column volumes, 50 g SiO$_2$, flow rate 0.50 column volumes per minute. 39.0 mg white solid, 55%. $^1$H-NMR (CDCl$_3$): 8.78 (1H, (d, J$_{1H-1H}$=1.5)), 8.68 (1H, (d, J$_{1H-1H}$=3.9)), 7.83 (1H, (d, J$_{1H-1H}$=8.0)), 7.59 (2H, (d, J$_{1H-1H}$=7.2)), 7.44 (1H, (t, J$_{1H-1H}$=7.4)), 7.37 (2H, (t, J$_{1H-1H}$=7.6)), 7.33 (1H, (dd, J$_{1H-1H}$=7.9, 4.9)). $^{13}$C-NMR: 151.64, 146.86 (t, J$_{13C-19F}$=4.8), 136.51, 133.09 (t, J$_{13C-19F}$=4.4), 131.93 (t, J$_{13C-19F}$=25.7), 130.27, 129.16, 126.65 (t, J$_{13C-19F}$=278.6), 126.57, 122.96. $^{19}$F-NMR: −76.47 (s). HRMS (ESI+): 238.0498 (M+H: 238.0496).

1-Benzyl-2-(difluoro(phenylthio)methyl)-1H-benzo[d]imidazole

Protocol A used. Substrate: Diphenyl disulfide. 0.30 mmol substrate, 1 equiv. R$^1$CF$_2$, reagent. Chromatography conditions: 5% to 40% ethyl acetate/hexanes over 12 column volumes, 50 g SiO$_2$, flow rate 0.50 column volumes per minute. 76.5 mg white solid, 70%. $^1$H-NMR (CDCl$_3$): 7.90 (1H, (d, J$_{1H-1H}$=8.0)), 7.70 (2H, (d, J$_{1H-1H}$=7.2)), 7.47 (1H, (t, J$_{1H-1H}$=7.4)), 7.40 (2H, (t, J$_{1H-1H}$=7.6)), 7.33 (1H, (t, J$_{1H-1H}$=7.1)), 7.30 (1H, overlap), 7.29 (2H, overlap), 7.26 (1H, overlap), 7.24 (1H, (d, J$_{1H-1H}$=8.0)), 7.10 (2H, (d, J$_{1H-1H}$=7.1)), 5.60 (2H, s). $^{13}$C-NMR: 145.34 (t, J$_{13C-19F}$=29.8), 141.42, 137.00, 135.88, 135.50, 130.44, 129.19, 128.83, 127.91, 126.32, 125.31, 124.94, 123.88 (t, J$_{13C-19F}$=275), 123.39, 121.41, 111.02, 48.57. $^{19}$F-NMR: −68.11 (s). HRMS (ESI+): 367.1074 (M+H: 367.1075).

2-(Difluoro(phenylthio)methyl)-5-(3,3-dimethylbut-1-yn-1-yl)thiophene

Protocol A used. Substrate: Diphenyl disulfide. 0.30 mmol substrate, 1 equiv. R$^1$CF$_2^-$ reagent. Chromatography conditions: 100% hexanes over 12 column volumes, 100 g SiO$_2$, flow rate 1.0 column volumes per minute. 42.0 mg colorless oil, 43%. $^1$H-NMR (CDCl$_3$): 7.63 (2H, (d, J$_{1H-1H}$=7.2)), 7.43 (1H, (t, J$_{1H-1H}$=7.4)), 7.38 (2H, (t, J$_{1H-1H}$=7.5)), 7.10 (1H, (d, J$_{1H-1H}$=3.8)), 6.96 (1H, (d, J$_{1H-1H}$=3.8)), 1.31 (9H, s). $^{13}$C-NMR: 137.09 (t, J$_{13C-19F}$=30.3), 136.25, 130.38, 130.08, 129.07, 127.62, 127.23 (t, J$_{13C-19F}$=4.4), 127.08, 124.77 (t, J$_{13C-19F}$=276), 104.52, 71.42, 30.67, 28.30. $^{19}$F-NMR: −62.80 (s). HRMS (ESI+): 303.0673 (M-F: 303.0677).

N-(2-(5-(3,3-dimethylbut-1-yn-1-yl)thiophen-2-yl)-2,2-difluoro-1-phenylethyl)-4-methylbenzenesulfonamide Protocol A used. Substrate: N-tosyl benzaldimine. 0.30 mmol substrate, 1 equiv. R$^1$CF$_2$, reagent. Chromatography conditions: 0 to 40% ethyl acetate/hexanes over 16 column volumes, 50 g SiO2, flow rate 0.5 column volumes per minute. 99.1 mg white solid, 70%. $^1$H-NMR (CDCl$_3$): 7.50 (2H, (d, J$_{1H-1H}$=8.2)), 7.20 (1H, (t, J$_{1H-1H}$=7.3)), 7.14 (2H, (t, J$_{1H-1H}$=7.6)), 7.06 (2H, (d, J$_{1H-1H}$=7.6)), 7.04 (2H, (d, J$_{1H-1H}$=7.6)), 6.85 (1H, (d, J$_{1H-1H}$=3.6)), 6.81 (1H, (d, J$_{1H-1H}$=3.7)), 5.83 (1H, (d, J$_{1H-1H}$=9.3)), 4.91 (1H, (q, J$_{1H-19F}$=11.6)), 2.33 (3H, s), 1.29 (9H, s). $^{13}$C-NMR: 143.31, 137.00, 134.70 (t, J$_{13C-19F}$=30.8), 133.35, 130.41, 129.28, 128.55, 128.30, 128.29, 127.63 (t, J$_{13C-19F}$=6.0), 127.24, 126.95, 118.67 (t, J$_{13C-19F}$=249), 104.18, 71.39, 63.20 (t, J$_{13C-19F}$=29.8), 30.68, 28.26, 21.48. $^{19}$F-NMR: −92.88 (m). HRMS (ESI+): 454.1300 (M-F: 454.1311).

N-(2-(1-benzyl-1H-benzo[d]imidazol-2-yl)-2,2-difluoro-1-phenylethyl)-4-methylbenzenesulfonamide Protocol A used. Substrate: N-tosyl benzaldimine. 0.30 mmol substrate, 1 equiv. R$^1$CF$_2^-$ reagent. Chromatography conditions: 7 to 60% ethyl acetate/hexanes over 12 column volumes, 50 g SiO$_2$, flow rate 0.5 column volumes per minute. 129.3 mg white solid, 83%. $^1$H-NMR (CDCl$_3$): 7.83 (1H, (d, J$_{1H-1H}$=8.1)), 7.61 (2H, (d, J$_{1H-1H}$=8.2)), 7.49 (1H, (d, J$_{1H-1H}$=9.2)), 7.34 (2H, (overlap)), 7.33 (1H, (overlap)), 7.27 (1H, (t, J$_{1H-1H}$=7.5)), 7.20 (1H, (overlap)), 7.19 (1H, (overlap)), 7.16 (2H, (overlap)), 7.15 (1H, (overlap)), 7.13 (2H, (overlap)), 7.08 (2H, (d, J$_{1H-1H}$=8.1)), 6.85 (2H, (d, J$_{1H-1H}$=6.9)), 5.31 (2H, (q, J$_{1H-1H}$=16.6)), 5.29 (1H, (q, J$_{1H-19F}$=8.1))), 2.3 (3H, s). $^{13}$C-NMR: 144.27 (t, J$_{13C-19F}$=30.5), 143.01, 141.04, 137.76, 135.36, 135.07, 133.52 (d, J$_{13C-19F}$=4.8), 129.21, 129.04, 128.76, 128.42, 128.12, 127.79, 126.97, 126.14, 124.86, 123.41, 121.03, 116.47 (dd, J$_{13C-19F}$=249.6, 244.5), 110.90, 62.70 (t, J$_{13C-19F}$=27.7), 48.40 (d, J$_{13C-19F}$=6.7), 21.43. $^{19}$F-NMR: −87.94 (dd, J$_{1H-19F, 19F-19F}$=9.3, 275.4), −87.94 (dd, J$_{1H-19F, 19F-19F}$=9.9, 275.4)). HRMS (ESI+): 518.1703 (M+H: 518.1709).

N-(2-(4-bromophenyl)-2,2-difluoro-1-phenylethyl)-4-methylbenzenesulfonamide

Protocol A used. Substrate: N-tosyl benzaldimine. 0.30 mmol substrate, 1 equiv. R$^1$CF$_2^-$ reagent. Chromatography conditions: 0% to 25% ethyl acetate/hexanes over 12 column volumes, 50 g SiO$_2$, flow rate 0.5 column volumes per minute. 89.0 mg white solid, 63%. $^1$H-NMR (CDCl$_3$): 7.45 (2H, (d, J$_{1H-1H}$=8.1)), 7.37 (2H, (d, J$_{1H-1H}$=8.3)), 7.20 (1H, (t, J$_{1H-1H}$=7.3)), 7.14 (2H, (t, J$_{1H-1H}$=7.6)), 7.06 (2H, (d, J$_{1H-1H}$=8.0)), 7.04 (2H, (d, J$_{1H-1H}$=8.4)), 6.99 (2H, (d, J$_{1H-1H}$=7.6)), 5.58 (1H, (d, J$_{1H-19F}$=9.1)), 4.83 (1H, m), 2.34 (3H, s). $^{13}$C-NMR: 143.39, 137.02, 133.44, 132.86 (t, J$_{13C-19F}$=26.3), 131.36, 129.30, 128.56, 128.29, 128.24, 127.54 (t, J$_{13C-19F}$=6.0), 126.85, 124.82 (t, J$_{13C-19F}$=1.8), 120.22 (t, J$_{13C-19F}$=250.4), 63.06 (t, J$_{13C-19F}$=29.3), 21.50. $^{19}$F-NMR: −103.81 (dd, J$_{1H-19F, 19F-19F}$=11.9, 247.3)). HRMS (ESI+): 294.9934 (M-NTs: 294.9905).

N-(2-(3-pyridyl)-2,2-difluoro-1-phenylethyl)-4-methylbenzenesulfonamide

Protocol A used. Substrate: N-tosyl benzaldimine. 0.30 mmol substrate, 1 equiv. R$^1$CF$_2$, reagent. Chromatography conditions: 15% to 100% ethyl acetate/hexanes over 15 column volumes, 50 g SiO$_2$, flow rate 0.5 column volumes per minute. 40.2 mg white solid, 57%. $^1$H-NMR (CDCl$_3$): 8.60 (1H, (d, J$_{1H-1H}$=4.7)), 8.43 (1H, s), 7.51 (1H, (d, J$_{1H-1H}$=7.9)), 7.48 (2H, (d, J$_{1H-1H}$=8.0)), 7.20 (1H, (t, J$_{1H-1H}$=5.3)), 7.19 (1H, (t, J$_{1H-1H}$=7.4)), 7.11 (2H, (t, J$_{1H-1H}$=7.5)), 7.05 (2H, (d, J$_{1H-1H}$=7.9)), 6.97 (2H, (d, J$_{1H-1H}$=7.6)), 6.22 (1H, (d, J$_{1H-1H}$=9.2)), 4.89 (1H, (q, J$_{1H-19F}$=12.1)), 2.31 (3H, s). $^{13}$C-NMR: 151.23, 147.19 (t, J$_{13C-19F}$=6.4), 143.38, 137.11, 133.92 (t, J$_{13C-19F}$=5.7), 133.07, 129.97, 129.33 (t, J$_{13C-19F}$=26.2), 128.69, 128.39, 128.26, 126.88, 122.89, 119.80 (t, J$_{13C-19F}$=250.6), 63.20 (t, J$_{13C-19F}$=28.8), 21.42. $^{19}$F-NMR: −103.36 (dd, J$_{1H-19F}$, $_{19F-19F}$=11.3, 251.7)), −105.18 (dd, J$_{1H-19F}$, $_{19F-19F}$=12.8, 251.8)). HRMS (ESI+): 236.0883 (M+H: 236.0887).

(2-(3-pyridyl)-2,2-difluoro-1-phenylethanol)

Protocol A used. Substrate: benzaldehyde. 0.30 mmol substrate, 1 equiv. R$^1$CF$_2^-$ reagent. Chromatography conditions: 20% to 100% ethyl acetate/hexanes over 15 column volumes, 50 g SiO$_2$, flow rate 0.5 column volumes per minute. 47.7 mg white solid, 41%. $^1$H-NMR (CDCl$_3$): 8.59 (1H, (d, J$_{1H-1H}$=4.0)), 8.45 (1H, s), 7.50 (1H, (d, J$_{1H-1H}$=7.9)), 7.31 (1H, (t, J$_{1H-1H}$=7.2)), 7.28 (2H, (t, J$_{1H-1H}$=7.4)), 7.24 (1H, (dd, J$_{1H-1H}$=7.5, 5.2)), 7.19 (2H, (d, J$_{1H-1H}$=7.5)), 5.13 (1H, (t, J$_{1H-19F}$=9.1)), 3.41 (1H, (s, broad)). $^{13}$C-NMR: 150.83, 147.61 (t, J$_{13C-19F}$=6.5), 135.51 (d, J$_{13C-19F}$=3.9), 134.48 (t, J$_{13C-19F}$=5.9), 129.62 (t, J$_{13C-19F}$=26.3), 128.93, 128.15, 127.60, 122.56, 120.35 (t, J$_{13C-19F}$=248.6), 76.55 (dd, J$_{13C-19F}$=31.8, 29.8). $^{19}$F-NMR: −105.5 (dd, J$_{1H-19F}$, $_{19F-19F}$=9.2, 255.0)), −107.15 (dd, J$_{1H-19F}$, $_{19F-19F}$=8.6, 255.1)). HRMS (ESI+): 389.1127 (M+H: 389.1135).

(2-(4-bromophenyl)-2,2-difluoro-1-phenylethanol)

Protocol A used. Substrate: benzaldehyde. 0.30 mmol substrate, 1 equiv. R$^1$CF$_2^-$ reagent. Chromatography conditions: 2% to 15% ethyl acetate/hexanes over 15 column volumes, 50 g SiO$_2$, flow rate 0.5 column volumes per minute. 42.1 mg white solid, 45%. $^1$H-NMR (CDCl$_3$): 7.45 (2H, (d, J$_{1H-1H}$=8.2)), 7.32 (1H, (t, J$_{1H-1H}$=7.3)), 7.28 (2H, (t, J$_{1H-1H}$=7.4)), 7.18 (2H, (d, J$_{1H-1H}$=7.5)), 7.09 (2H, (d, J$_{1H-1H}$=8.2)), 5.07 (1H, (t, J$_{1H-19F}$=31.1)), 2.54 (1H, s). $^{13}$C-NMR: 135.47 (t, J$_{13C-19F}$=2.1), 132.59 (t, J$_{13C-19F}$=26.5), 131.06 (t, J$_{13C-19F}$=0.3), 128.84, 128.12 (t, J$_{13C-19F}$=6.2), 128.09, 127.66, 124.56 (t, J$_{13C-19F}$=2.0), 120.86 (t, J$_{13C-19F}$=248.6), 76.60 (t, J$_{13C-19F}$=31.1). $^{19}$F-NMR: −109.46 (dd, J$_{1H-19F}$, $_{19F-19F}$=9.7, 248.4)), −110.34 (dd, J$_{1H-19F}$, $_{19F-19F}$=8.9, 248.4)). HRMS (ESI+): 294.9926 (M-OH: 294.9934).

(2-(5-(3,3-dimethylbut-1-yn-1-yl)thiophen-2-yl)-2,2-difluoro-1-phenylethanol)

Protocol A used. Substrate: benzaldehyde. 0.30 mmol substrate, 1 equiv. R$^1$CF$_2^-$ reagent. Chromatography conditions: 2% to 15% ethyl acetate/hexanes over 15 column volumes, 50 g SiO$_2$, flow rate 0.5 column volumes per minute. 83.5 mg white solid, 87%. $^1$H-NMR (CDCl$_3$): 7.33 (1H, (m, overlap)), 7.32 (2H, (m, overlap)), 7.30 (2H, (m, overlap)), 6.93 (1H, (d, J$_{1H-1H}$=3.2)), 6.82 (1H, (d, J$_{1H-1H}$=3.8)), 5.10 (1H, (td, J$_{1H-1H,\ 1H-19F}$=3.2, 9.3)), 2.64 (1H, (d, J$_{1H-1H}$=2.7)), 1.30 (9H, s). $^{13}$C-NMR: 135.32 (d, J$_{13C-19F}$=2.7), 134.29 (t, J$_{13C-19F}$=30.9), 130.21, 128.87, 128.14, 127.67, 127.54 (t, J$_{13C-19F}$=5.8), 127.03 (t, J$_{13C-19F}$=1.7), 119.52 (t, J$_{13C-19F}$=247.2), 103.98, 76.63 (t, J$_{13C-19F}$=31.3), 71.51, 30.70, 28.27. $^{19}$F-NMR: −97.82 (dd, J$_{1H-19F}$, $_{19F-19F}$=8.6, 256.0)), −93.69 (dd, J$_{1H-19F}$, $_{19F-19F}$=9.7, 256.4)). HRMS (ESI+): 303.1020 (M-OH: 303.1019).

(2-(1-benzyl-1H-benzo[d]imidazol-2-yl)-2,2-difluoro-1-phenylethanol):

Protocol A used. Substrate: benzaldehyde. 0.30 mmol substrate, 1 equiv. R$^1$CF$_2^-$ reagent. Chromatography conditions: 5% to 40% ethyl acetate/hexanes over 15 column volumes, 100 g SiO$_2$, flow rate 0.25 column volumes per minute. 88.5 mg white solid, 81%. $^1$H-NMR (CDCl$_3$): 7.86 (1H, (d, J$_{1H-1H}$=6.9)), 7.58 (2H, (d, J$_{1H-1H}$=7.1)), 7.41 (2H, (t, J$_{1H-1H}$=6.5)), 7.40 (1H, (t, J$_{1H-1H}$=6.4)), 7.36 (1H, (t, J$_{1H-1H}$=7.6)), 7.32 (1H, (t, J$_{1H-1H}$=7.6)), 7.29 (1H, overlap), 7.28 (2H, (t, J$_{1H-1H}$=7.8)), 7.26 (1H, (d, J$_{1H-1H}$=6.9)), 7.10 (2H, (d, J$_{1H-1H}$=6.4)), 5.68 (1H, (d, J$_{1H-19F}$=20.9)), 5.56 (1H, (d, J$_{1H-1H}$=2.7)), 5.54 (2H, s). $^{13}$C-NMR: 146.24 (t, J$_{13C-19F}$=30.9), 140.82, 135.39, 135.23, 234.37, 128.84, 128.60, 128.08, 127.95, 126.47, 125.03, 123.57, 120.80, 115.91 (dd, J$_{13C-19F}$=249.7, 241.7), 111.23, 74.71 (dd, J$_{13C-19F}$=28.6, 23.0), 48.51. $^{19}$F-NMR: −101.17 (d, J$_{1H-19F}$, $_{19F-19F}$=285.1)), −114.02 (dd, J$_{1H-19F}$, $_{19F-19F}$=2.9, 285.2)). HRMS (ESI+): 365.1460 (M+H: 365.1465).

1-benzyl-2-(difluoro(pyridin-4-yl)methyl)-1H-benzo[d]imidazole

Protocol B used. Substrate: pyridine-B(C$_6$F$_5$)$_3$. 0.30 mmol substrate, 1 equiv. R$^1$CF$_2^-$ reagent. Chromatography conditions: 10% to 100% ethyl acetate/hexanes over 18 column volumes, 50 g SiO$_2$, flow rate 0.5 column volumes per minute. 62.4 mg white solid, 62%. $^1$H-NMR (CDCl$_3$): 8.76 (2H, (d, J$_{1H-1H}$=5.3)), 7.81 (1H, (d, J$_{1H-1H}$=5.2)), 7.53 (2H, (d, J$_{1H-1H}$=5.3)), 7.31 (1H, (overlap)), 7.30 (T, 1H, (overlap)), 7.29 (2H, (overlap)), 7.28 (1H, (overlap)), 7.27 (1H, (overlap)), 7.09 (2H, (d, J$_{1H-1H}$=7.6)), 5.64 (2H, s). $^{13}$C-NMR: 150.21, 146.00 (t, J$_{13C-19F}$=32.2), 142.55 (t, J$_{13C-19F}$=27.0), 141.50, 136.03, 135.55, 128.88, 127.99, 126.27, 125.07, 123.30, 121.43, 120.55 (t, J$_{13C-19F}$=5.4), 116.39 (t, J$_{13C-19F}$=240.7), 110.91, 48.59 (t, J$_{13C-19F}$=3.4). $^{19}$F-NMR: −94.18 (2F, s). HRMS (ESI+): 336.1310 (M+H: 336.1312).

(2-(1-benzyl-1H-benzo[d]imidazol-2-yl)-2,2-difluoro-1-phenylethanol):

Protocol B used. Substrate: pyridine-B(C$_6$F$_5$)$_3$. 0.30 mmol substrate, 1 equiv. R$^1$CF$_2^-$ reagent. Chromatography conditions: 1-10% MeOH/DCM over 18 column volumes, 50 g SiO$_2$, flow rate 0.5 column volumes per minute. A fraction eluting at 15 CV was then repurified using reverse-phase chromatography: 0-100% H$_2$O/MeCN over 12 CV, 25 g Biotage SNAP Ultra C$_{18,\ 1}$ CV/min. Finally, the product was extracted into hexanes from 5% KOH (3×5 mL) and evaporated. 41.0 mg colorless oil, 66%. $^1$H-NMR (CDCl$_3$): 8.75 (2H, (d, J$_{1H-1H}$=5.2)), 8.74 (1H, s), 8.72 (1H, (d, J$_{1H-1H}$=4.2)), 7.80 (1H, (d, J$_{1H-1H}$=7.9)), 7.42 (2H, (d, J$_{1H-1H}$=5.0)), 7.39 (1H, (dd, J$_{1H-1H}$=8.1, 5.0)). $^{13}$C-NMR: 151.71, 150.58, 147.10 (t, J$_{13C-19F}$=5.9), 144.58 (t, J$_{13C-19F}$=29.5), 133.29 (t, J$_{13C-19F}$=5.3), 132.13 (t, J$_{13C-19F}$=28.3), 123.36, 119.90 (t, J$_{13C-19F}$ 5.3), 118.49 (t, J$_{13C-19F}$=243.8). $^{19}$F-NMR: −93.79 (2F, s). HRMS (ESI+): 207.0729 (M+H: 207.0734).

(2-(1-benzyl-1H-benzo[d]imidazol-2-yl)-2,2-difluoro-1-phenylethanol):

Protocol B used. Substrate: benzaldehyde. 0.30 mmol substrate, 1 equiv. $R^1CF_2^-$ reagent. Chromatography conditions: 10-100% ethyl acetate/hexanes over 18 column volumes, 50 g $SiO_2$, flow rate 0.5 column volumes per minute. A fraction eluting at 8 CV was then repurified using reverse-phase chromatography: 0-100% $H_2O$/MeCN over 12 CV, 25 g Biotage SNAP Ultra $C_{18, 1}$ CV/min. 32.4 mg white solid, 38%. $^1$H-NMR ($CDCl_3$): 8.72 (2H, (d, $J_{1H-1H}$=5.0)), 7.58 (2H, (B, $J_{1H-1H}$=8.2)), 7.39 (2H, (d, $J_{1H-1H}$=5.0)), 7.36 (2H, (d, $J_{1H-1H}$=8.2)). $^{13}$C-NMR: 150.43, 145.13 (t, $J_{13C-19F}$=29.8), 135.19 (t, $J_{13C-19F}$=28.2), 131.97, 127.28 (t, $J_{13C-19F}$=5.6), 125.02, 119.97 (t, $J_{13C-19F}$=5.3), 118.96 (t, $J_{13C-19F}$=243.3). $^{19}$F-NMR: −94.61 (2F, s). HRMS (ESI+): 283.9883 (M+H: 283.9886).

Octahydro-[1,2]azaborinino[1,2-a][1,2]azaborinine

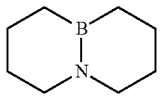

1,4,6,9-tetrahydro-[1,2]azaborinino[1,2-a][1,2]azaborinine (4.00 g, 30.0 mmol) was dissolved in hexane (8 mL) with 1.2 g Pd/C (10%) in a Fisher-Porter tube. The reaction vessel was pressurized with $H_2$ (70 psi dynamic pressure) and heated at 80° C. for 16 hours. The resulting mixture was filtered and evaporated at 0° C. under vacuum to afford the title compound. 3.90 g colorless oil, 95%. $^1$H-NMR ($C_6D_6$): 2.60 (4H, broad), 1.47 (8H, broad), 0.83 (4H, broad). $^{11}$B-NMR: 42.95 (1B, broad). These spectroscopic features matched literature values reported in 1968 by Dewar and Jones (Dewar et. al., *J. Am. Chem. Soc.*, 1968, 90, 2137-2144).

[K(18-crown-6)][1,2,3,4-tetrahydro-[1,2]azaborinino[1,2-a][1,2]azaborinine($CF_2H$)](7)

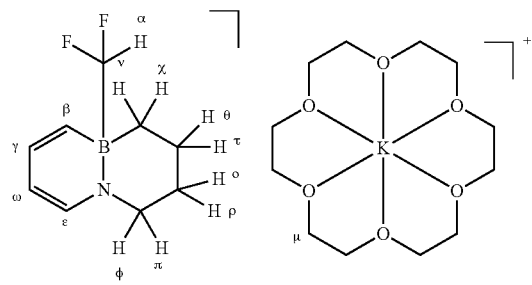

1,2,3,4-Tetrahydro-[1,2]azaborinino[1,2-a][1,2]azaborinine (471 mg, 3.59 mmol) and 18-crown-6 (934 mg, 3.59 mmol) were dissolved in 5 mL THF and cooled to 0° C. Solid potassium toluide (466 mg, 3.58 mmol) was added in one portion and the mixture rapidly stirred for 10 minutes, providing a homogeneous red solution. Difluoromethane (180 mL gas, 7 mmol) was added in one portion, and the solution stirred at room temperature for 30 minutes. The solution was poured into 100 mL pentane and stirred at room temperature for 15 minutes. The suspension was filtered and washed with pentane to provide the title compound as a red solid (1.091 mg, 62%). $^1$H-NMR (THF-d8): 5.78 (γ, 1H, (t, $J_{1H-1H}$=8.4)), 5.72 (α, 1H, (t, $J_{1H-19F}$=51.7)), 5.71 (E, 1H, (d, $J_{1H-1H}$=6.6)), 4.66 (1, 1 H, (d, $J_{1H-1H}$=11.8)), 3.75 (co, 1H, (ddd, $J_{1H-1H}$=6.6, 5.1, 1.4)), 3.61 (μ, 24H, s), 3.44 (π, 1H, (tt, $J_{1H-1H}$=11.9, 2.7)), 2.60 (φ, 1H, (dt, $J_{1H-1H}$=11.8, 2.7)), 1.73 (θ, 1H, overlap)), 1.67 (t, 1H, overlap)), 1.41 (o, 1H, overlap)), 1.36 (ρ, 1H, overlap)), 0.37 (ν, 1H, (d, $J_{1H-1H}$=12.5)), 0.11 (χ, 1H, broad). $^{13}$C-NMR: 140.95, 136.68 (broad), 128.51 (broad), 127.26, 89.24, 70.06, 54.54, 31.24, 25.94, 18.28 (broad). $^{19}$F-NMR: −127.10 (1F, ddd, $J_{19F-1H, 19F-11B}$=311.0, 54.0, 20.7), −131.96 (1F, ddd, $J_{19F-1H, 19F-11B}$=312.6, 51.9, 28.6). $^{11}$B-NMR: −10.22 (1B, sharp).

[K(18-crown-6)][octahydro-[1,2]azaborinino[1,2-a][1,2]azaborinine($CF_2H$)](8)

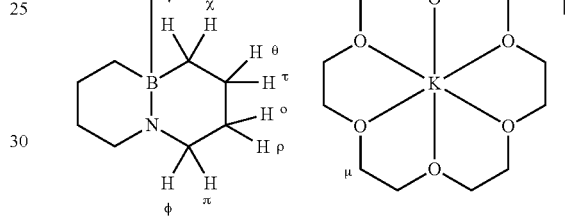

Octahydro-[1,2]azaborinino[1,2-a][1,2]azaborinine (1.00 g, 7.23 mmol) was dissolved in 36 mL THF and cooled to −80° C. A solution of KN(iPr)$_2$ (0.967 g, 6.95 mmol) in 10 mL THF cooled at −80° C. was then added in one portion, and the mixture stirred for one minute. The reaction vessel was sealed with a septum and difluoromethane (361 mL, 13.9 mmol) was added as a gas using a syringe with rapid stirring. After ten minutes, 18-crown-6 (1.908 g, 7.23 mmol) was then added, the mixture stirred until homogeneous at room temperature (15 minutes), and poured into 200 mL pentane. The suspension was stirred at room temperature for 15 minutes, filtered, and the filtercake washed with pentane (300 mL) to afford the title compound as a crystalline white solid (2.83 g, 78%). $^1$H-NMR (THF-d8): 5.93 (α, 1H, (t, $J_{1H-19F}$=51.3)), 3.62 (μ, 24H, s), 2.86 (π, 1H, (td, $J_{1H-1H}$=9.0, 4.6)), 2.48 (χ, 1H, (d, $J_{1H-1H}$=10.6)), 1.56 (o, 1H, overlap)), 1.55 (θ, 1H, overlap)), 1.51 (ρ, 1H, overlap)), 1.24 (τ, 1H, (td, $J_{1H-1H}$=9.1, 7.1, 4.5)), 0.10 (ν, 1H, (dd, $J_{1H-1H}$=12.9, 5.3)), 0.06 (χ, 1H, broad). $^{13}$C-NMR: 70.03, 54.21, 29.72, 25.96, 18.80 (broad). $^{19}$F-NMR: −127.04 (2F, dd, $J_{19F-1H, 19F-11B}$=51.9, 18.0). $^{11}$B-NMR: −12.38 (1B, sharp). A single crystal was obtained by allowing pentane to diffuse into a saturated solution of 8 in THF at −30° C.

Alternative Preparation: Octahydro-[1,2]azaborinino[1,2-a][1,2]azaborinine (274 mg, 2.00 mmol) and 18-crown-6 (528 mg, 2.00 mmol) were dissolved in 10 mL THF and cooled to 0° C. Solid $KCH_2Ph$ (260 mg, 2.00 mmol) was then added in one portion, and the mixture stirred for 15 minutes. The reaction vessel was sealed with a septum and difluoromethane (100 mL, ~4.0 mmol) was added as a gas using a syringe with rapid stirring. After ten minutes, the mixture was poured into 100 mL pentane. The suspension was stirred at room temperature for 15 minutes, filtered, and the filtercake washed with pentane (300 mL) to afford the title compound as a crystalline white solid (330 mg, 34%).

A library of boron-based Lewis acids was screened with computed $CF_2H^-$ affinities ranging from 8 to 32 kCal/mol for experimental evaluation. $CH_2F_2$ (2.0 equiv.) was added to a 1:1:1 mixture of LA, 18-crown-6, and $KCH_2Ph$ prepared at −80° C. While LAs with $CF_2H^-$ affinity below 29 kCal/mol did not provide stabilized $CF_2H^-$ moieties, LAs with strengths ranging from 29 to 32 kCal/mol (1,2,3,4-tetrahydro-[1,2]azaborinino[1,2-a][1,2]azaborinine (BN-substituted tetralin), hexamethylborazine ($B_3N_3Me_6$), and octahydro-[1,2]azaborinino[1,2-a][1,2]azaborinine (BN-substituted decalin)) provided LA-$CF_2H^-$ adducts (7:62%, 8:34%). The yield of 8 was improved (78%) when $KN(iPr)_2$ was used in place of $KCH_2Ph$, likely due to its greater steric bulk. Each adduct was isolated on gram scale as a free-flowing crystalline solid that could be handled at room temperature and stored for six months at −20° C. without decomposition. To the best of our knowledge, these are the first tetrahedral $R_3B$—$CF_2H^-$ adducts.

The high $CF_2H^-$ affinity of the Lewis acids used to generate 7 and 8 should present a significantly higher barrier to dissociative $CF_2H^-$ transfer than for related $CF_3$ transfer ($CF_2H^-$ vs. $CF_3$ affinity of $B_3N_3Me_6$: −31 vs. −22 kcal/mol). Accordingly, 7 and 8 do not transfer $CF_2H^-$ to benzophenone, dinitrobenzene, $SiMe_3Cl$, or benzyl bromide at temperatures below 80° C. in THF. In contrast to reactions with organic electrophiles, which may require dissociative $CF_2H^-$ transfer, transmetallation reactions with closely related Suzuki methylation reagents are proposed to follow associative mechanisms in which in-situ generated $B(OH)_3(CH_3)$ coordinates to a palladium(II) center through an available lone pair on one of the hydroxide groups, followed by $CH_3$ transfer to the metal center via a four-membered transition state. Nucleophilic sites in 7 and 8 are hypothesized to promote associative transmetalation in a similar fashion.

We tested the ability of 7 and 8 to transfer $CF_2H^-$ to catalytically relevant inorganic electrophiles in reactions with Pd(TMEDA)PhI (9). Heating a mixture of 7 and Pd(TMEDA)(Ph)I for 18 hours at 80° C. affords a 9:91 ratio of Pd(TMEDA)($CF_2H$)(Ph) (10) and Pd(TMEDA)($CF_2H)_2$ (11) in 59% combined yield. However, if 7 is combined with 9 in a 1:1.5 ratio, the reaction affords transmetallated products in 55% combined yield and a 10:11 ratio of 48:51. Treatment of this mixture with two equiv. DPPF triggers reductive elimination of 11, affording difluoromethylbenzene in 28% overall yield. Difluoromethane was quantified by $^{19}F$-NMR spectroscopy and GCMS with comparison to an authentic standard. In contrast, 8 reacts with 9 to afford Pd(TMEDA)(Ph)($CF_2H$) in trace quantities (<3%).

The high reactivity of 7 in comparison with 8, despite their similar calculated barriers to $CF_2H^-$ dissociation (29-32 kCal/mol), suggested that an associative mechanism sensitive to steric and templating properties could be operative. In an associative mechanism for transmetalation, well-situated nucleophilic sites present in 7, but not in 8, could coordinate to Pd(II) and facilitate $CF_2H^-$ transfer through stabilization of a pre-reactive complex. When one equiv. of 7 was combined with Pd(TMEDA)(Ph)I at 25° C., a new addition product 10 was observed by $^1H$, $^{11}B$, and $^{19}F$-NMR spectroscopy in 98% chemical yield. Substantially shifted $sp^2C$—H resonances (>2 ppm) in the BN-substituted tetralin moiety, suggesting that Pd(II) coordinates to alkene units. Titration of 9 with 7 in THF-$d_8$ indicated that the adduct was tightly bound, with no peak shifts or broadening observed when the concentration of 7 was varied from 25 µM to 200 µM in a 100 µM solution of 9. In contrast, 8 does not react with 9. These data suggest that the electron-rich alkene groups present in 7 template $CF_2H^-$ transfer to Pd(II) through a β-alkyl elimination mechanism. In reactions with 8, this mechanism may be inaccessible. Without intending to be bound by theory, mechanistic investigation supports an associative mechanism for $CF_2H^-$ transfer, evidenced by the formation of an observable associated intermediate prior to transmetalation.

Reaction between 7 and 9, in-situ characterization of 10

7 (9.7 mg, 20 µmol) and Pd(TMEDA)PhI (9) (8.4 mg, 20 µmol) were dissolved in 1 mL THF-d8 at 25° C., and the reaction mixture allowed to stand for one hour. The mixture was then analyzed by NMR spectroscopy. A new compound was observed in 97% chemical yield. $^1H$-NMR (THF-d8): 7.86 (E, 1H), 7.60 (u, 2H, (d, $J_{1H-1H}$=7.4)), 7.40 (t, 2H, (t, $J_{1H-1H}$=7.7)), 7.29 (κ, 1H, (t, $J_{1H-1H}$=7.4)), 5.55 (α, 1H, (t, $J_{1H-19F}$=51.0)), 4.89 (1, 1H), 4.85 (γ, 1H), 4.07 (ω, 1H), 3.24 (φ, 1H), 2.94 (π, 1H), 2.30 (ζ, 4H), 2.15 (Ψ, 12H), 1.75 (o, 1H), 1.60 (θ, 1H), 1.55 (τ, 1H), 1.35 (ρ, 1H), 0.89 (ν, 1H), 0.46 (χ, 1H). $^{19}F$-NMR: −126.09 (1F, dd, $J_{1H-19F}$, $_{19F-19F}$=313.5, 51.6), −129.01 (1F, dd, $J_{1H-19F}$, $_{19F-19F}$=313.3, 51.0). $^{11}B$-NMR: −10.66 (1B, sharp). Structure of 10:

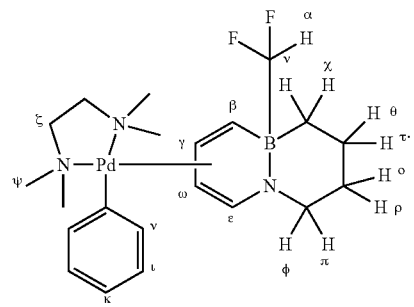

Titration of 7 with 9

7 and 9 were combined as stock solutions in THF to produce solutions with desired concentrations in the presence of 10.0 mM difluoromethyl phenyl ether as internal standard. Conversion to 5 was monitored by $^1H$ NMR spectroscopy. The o-protons in $C_6H_5$—$OCF_2H$ and the o-protons in the Pd—$C_6H_5$ unit in 5 were integrated in the $^1H$ NMR spectrum to provide the concentration of 5.

| Conc. 7 | Conc. 9 | Yield 10 (vs. 9) |
|---|---|---|
| 2.50 mM | 10.0 mM | 29% |
| 5.00 mM | 10.0 mM | 58% |
| 10.0 mM | 10.0 mM | 97% |
| 15.0 mM | 10.0 mM | 98% |
| 20.0 mM | 10.0 mM | 87% |

Reaction of 8 with 9

8 (9.7 mg, 20 µmol) and 9 (8.4 mg, 20 µmol) were dissolved in 1 mL THF-d8 at 25° C., and the reaction mixture allowed to stand for one hour. The mixture was then analyzed by NMR spectroscopy. No new products were observed. After heating these mixtures at 80° C. for 12 hours, Pd(TMEDA)($CF_2H)_2$ ($^{19}F$ NMR: −101; lit: −100.5) was observed in trace yield (11:3.4%).

Preparation of Pd(TMEDA)(Ph)(CF$_2$H) and Pd(TMEDA)(CF$_2$H)$_2$ from 7 and 9

7 and 9 were dissolved in 1 mL THF at 25° C., and the reaction mixture heated at 80° C. for two hours. The mixture was then analyzed by NMR spectroscopy. Pd(TMEDA) (CF$_2$H)$_2$ ($^{19}$F NMR: −100.5 in DMF-d7) and Pd(TMEDA) (Ph)(CF$_2$H) ($^{19}$F NMR: −100.3 in CDCl$_3$)$^{14}$ were observed. When 20 μmol of 7 and 20 μmol of 9 were combined, the yields of these products were 54% and 5%. When 20 μmol of 7 and 30 μmol of 9 were combined, the product distribution changed and the yields were 28% and 26%. DPPF (40 μmol, 22.2 mg) was then added to each reaction, and the reactions were then heated to 80° C. for a further two hours, and $^{19}$F-NMR spectra were recorded to measure the yield of difluoromethylbenzene (−111.24 ppm). The presence of difluoromethylbenzene was validated by GC-MS with comparison to an authentic sample.

The foregoing description is given for clearness of understanding only, and no unnecessary limitations should be understood therefrom, as modifications within the scope of the disclosure herein may be apparent to those having ordinary skill in the art.

Throughout this specification and the claims which follow, unless the context requires otherwise, the word "comprise" and variations such as "comprises" and "comprising" will be understood to imply the inclusion of a stated integer or step or group of integers or steps but not the exclusion of any other integer or step or group of integers or steps.

What is claimed is:

1. A compound of Formula (I):
having a structure of:

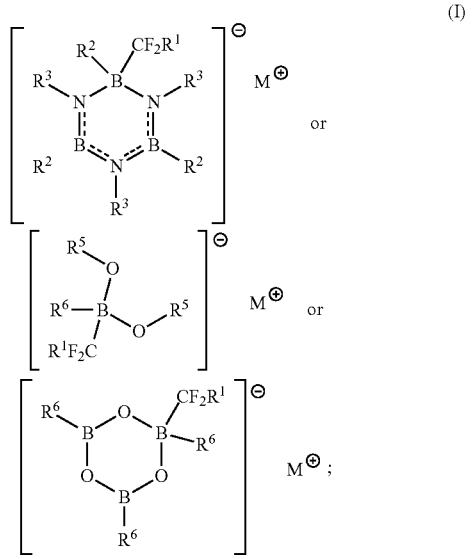

wherein:
the dashed lines indicate optional double bonds;
R$^1$ is C$_{6-20}$ aryl or C$_{1-15}$ heteroaryl, and the heteroaryl comprises 1-5 ring heteroatoms selected from N, O, and S;
each R$^2$ and R$^3$ is independently OH, N(R$^4$)$_2$, C$_{1-6}$ alkyl, C$_{3-8}$cycloalkyl, OC$_{1-6}$ alkyl, or OC$_{3-8}$ cycloalkyl; or adjacent R$^2$ and R$^3$, taken together with the atoms to which they are attached, form an optionally substituted 5-7 membered ring;
each R$^4$ is independently C$_{1-6}$ alkyl or C$_{3-8}$cycloalkyl;
each R$^5$ is independently C$_{1-6}$ alkyl, C$_{3-8}$cycloalkyl; or
each R$^5$ taken together with the atoms to which they are attached form an optionally substituted 5-7 membered ring;
each R$^6$ is independently C$_{1-6}$ alkyl, C$_{3-8}$cycloalkyl, OC$_{1-6}$ alkyl, or OC$_{3-8}$cycloalkyl; and
M comprises a counterion.

2. The compound of claim 1, wherein R$^1$ is C$_{6-20}$aryl.

3. The compound of claim 1, wherein R$^1$ is C$_{1-15}$heteroaryl.

4. The compound of claim 1, wherein R$^1$ is selected from the group consisting of:

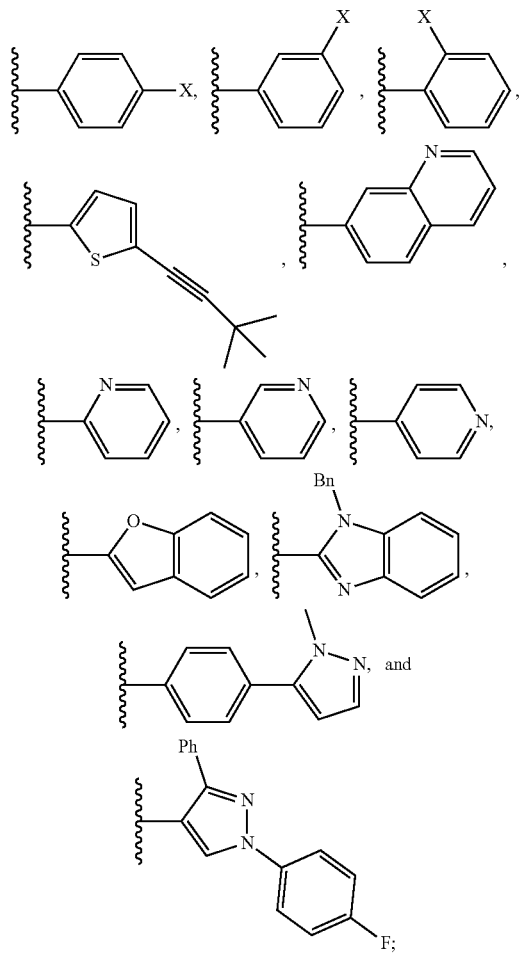

and
X is H, F, Cl, Br, I, CHs, OH, NH$_2$, NO$_2$, C$_{1-4}$ alkyl, OC$_{1-4}$ alkyl, CO$_2$H, CHO, CF$_3$, or CN.

5. The compound of claim 1, wherein at least one R$^2$ or R$^3$ is methyl.

6. The compound of claim 1 having a structure selected from the group consisting of:

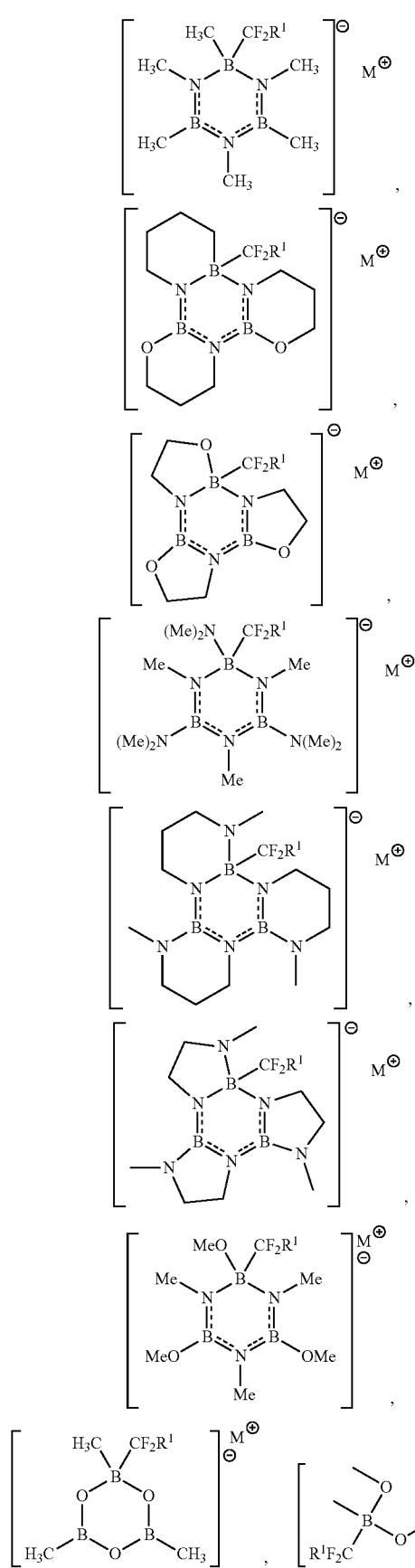

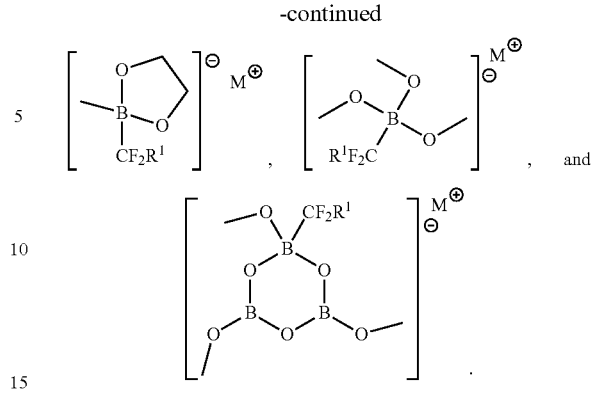

7. A composition comprising the compound of claim 1 and a crown ether.

8. A method for preparing the compound of claim 1, comprising contacting H—CF$_2$R$^1$ with a Lewis acid, a base, and optionally a crown ether under conditions sufficient to form the compound, wherein the Lewis acid has a structure:

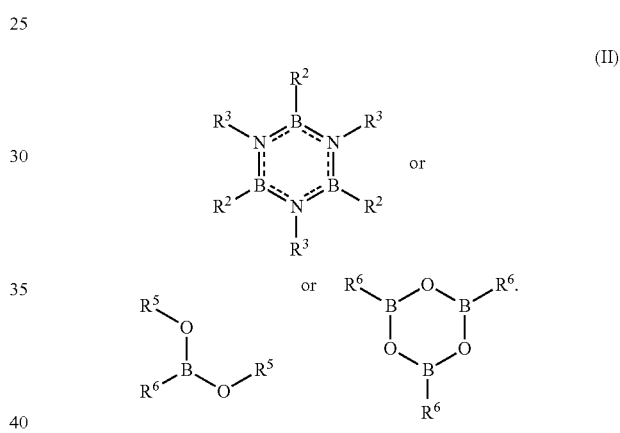

(II)

9. The method of claim 8, wherein the H—CF$_2$R$^1$ is selected from the group consisting of:

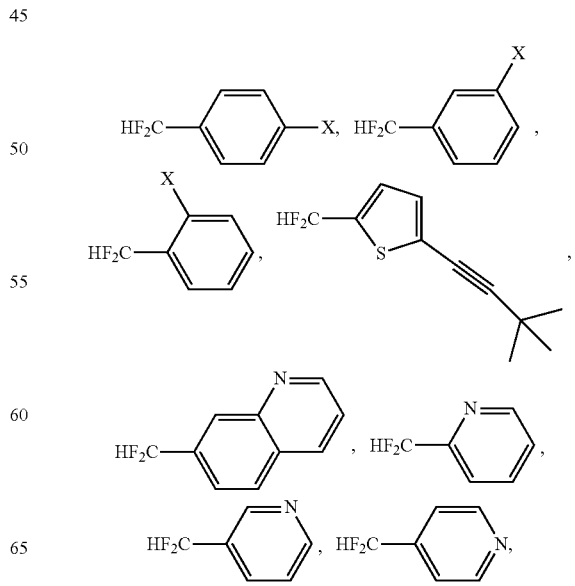

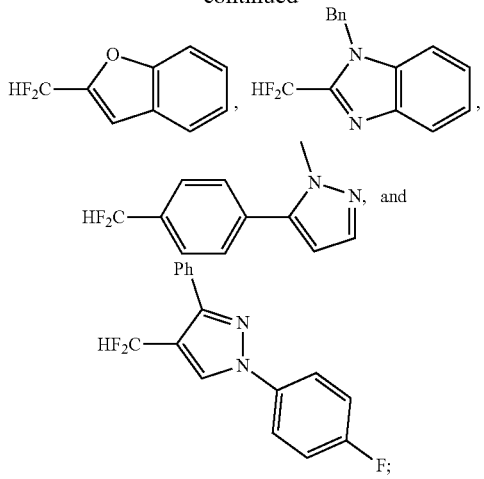

and

X is H, F, Cl, Br, I, CH₃, OH, NH₂, NO₂, C₁₋₄alkyl, OC₁₋₄alkyl, CO₂H, CHO, CF₃, or CN.

10. A method of forming an aromatic difluorocarbon compound comprising admixing the compound of claim 1, with an electrophile under conditions sufficient to couple the electrophile and $CF_2R^1$ to form the aromatic difluorocarbon compound.

11. A compound of Formula (III)

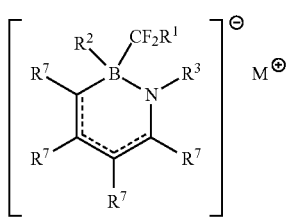

(III)

wherein:
the dashed lines indicate optional double bonds;
$R^1$ is H, $C_{6-20}$aryl, or $C_{1-15}$heteroaryl, and the heteroaryl comprises 1-5 ring heteroatoms selected from N, O, and S;
$R^2$ and $R^3$ are independently OH, $N(R^4)_2$, $C_{1-6}$alkyl, $C_{3-8}$cycloalkyl, $OC_{1-6}$ alkyl, or $OC_{3-8}$ cycloalkyl, or $R^2$ and $R^3$, taken together with the atoms to which they are attached, form an optionally substituted 5-7 membered ring;
each $R^4$ is independently $C_{1-5}$alkyl or $C_{3-8}$cycloalkyl;
each $R^7$ is independently H, $C_{1-6}$ alkyl, $C_{3-8}$cycloalkyl, or at least one adjacent $R^7$ pair, taken together with the atoms to which they are attached, form an optionally substituted 5-7 membered ring; and
M comprises a counterion.

12. The compound of claim 11, selected from the group consisting of:

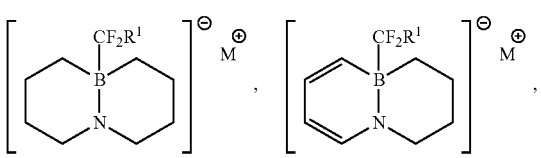

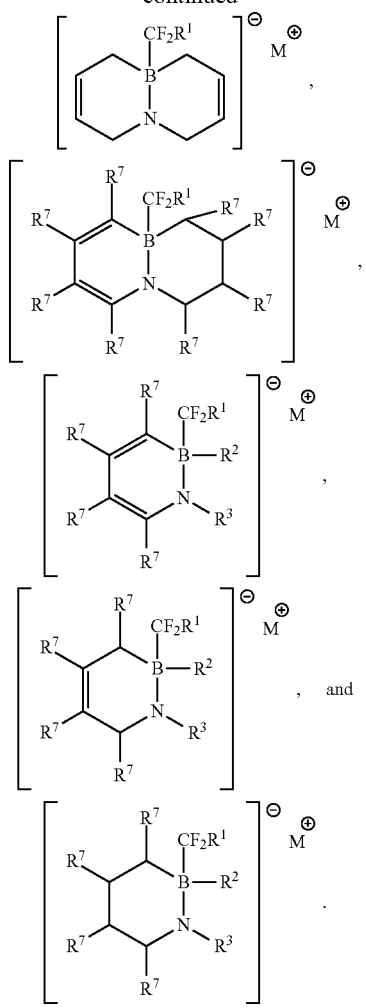

13. The compound of claim 11, wherein $R^1$ is H.

14. The compound of claim 11, wherein $R^1$ is $C_{6-20}$ aryl.

15. The compound of claim 11, wherein $R^1$ is $C_{1-15}$ heteroaryl.

16. The compound of claim 11, wherein $R^1$ is selected from the group consisting of:

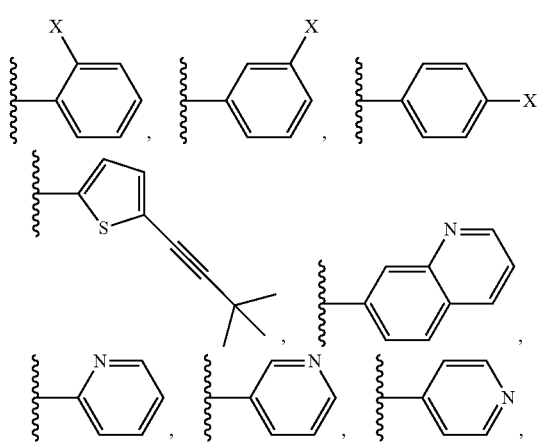

-continued

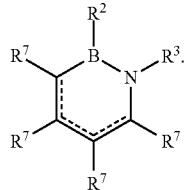

and

X is H, F, Cl, Br, I, $CH_3$, OH, $NH_2$, $NO_2$, $C_{1-4}$ alkyl, $OC_{1-4}$ alkyl, $CO_2H$, CHO, $CF_3$, or CN.

17. The compound of claim 11, wherein at least one of $R^2$ and $R^3$ is methyl.

18. A composition comprising the compound of claim 11 and a crown ether.

19. A method for preparing the compound of claim 11, comprising contacting $H-CF_2R^1$ with a Lewis acid, a base, and optionally a crown ether under conditions sufficient to form the compound, wherein the Lewis acid has a structure:

20. A method of forming a difluorocarbon compound comprising admixing the compound of, claim 11, with an electrophile under conditions sufficient to couple the electrophile and $CF_2R^1$ to form the aromatic difluorocarbon compound.

* * * * *